United States Patent
Nakaya et al.

(10) Patent No.: US 10,562,283 B2
(45) Date of Patent: Feb. 18, 2020

(54) ACRYLIC RESIN LAMINATE FILM, MANUFACTURING METHOD THEREFOR, AND MELAMINE DECORATIVE BOARD

(71) Applicant: Mitsubishi Rayon Co., Ltd., Chiyoda-ku (JP)

(72) Inventors: Fuminori Nakaya, Otake (JP); Keiko Shouji, Otake (JP); Junichi Abe, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 166 days.

(21) Appl. No.: 14/894,009

(22) PCT Filed: May 27, 2014

(86) PCT No.: PCT/JP2014/063898
§ 371 (c)(1),
(2) Date: Nov. 25, 2015

(87) PCT Pub. No.: WO2014/192708
PCT Pub. Date: Dec. 4, 2014

(65) Prior Publication Data
US 2016/0107428 A1    Apr. 21, 2016

(30) Foreign Application Priority Data

May 27, 2013 (JP) ................................. 2013-110816

(51) Int. Cl.
*B32B 27/30* (2006.01)
*B32B 27/08* (2006.01)
(Continued)

(52) U.S. Cl.
CPC .......... *B32B 27/308* (2013.01); *B29C 48/022* (2019.02); *B29C 48/08* (2019.02);
(Continued)

(58) Field of Classification Search
CPC . B32B 27/30; B32B 27/308; B32B 2264/025; B32B 2333/08; B32B 2333/12; B32B 7/12; B32B 7/14; Y10T 428/31855; Y10T 428/31909; Y10T 428/31928; Y10T 428/31935; Y10T 428/24942; Y10T 428/2495; Y10T 428/24959; Y10T 428/24975; Y10T 428/26; Y10T 428/263; Y10T 428/264; Y10T 428/265; Y10T 428/266; Y10T 428/269; Y10T 428/31925; Y10T 428/28; Y10T 428/2848; Y10T 428/2852; Y10T 428/2878; Y10T 428/2891; C09J 7/00; C09J 133/00; C09J 133/04; C09J 133/08; C09J 133/10; C09J 133/12; C09J 7/02; C09J 7/0217; C09J 7/10; C09J 7/22; C09J 7/24; C09J 7/26; C09J 7/30; C09J 7/38; C09J 7/381; C09J 7/385; C09J 133/06; C09J 133/062; C09J 133/064; C09J 133/066; C09J 133/068; C08L 33/08; C08L 33/10; C08L 33/12; C08L 33/00; C08L 33/04; C08L 33/06; C08L 33/062; C08L 33/064; C08L 33/066; C08L 33/068; C08F 20/06; C08F 220/06; C08F 265/06; C08F 20/00; C08F 20/02; C08F 20/04; C08F 20/10; C08F 20/12;
(Continued)

(56) References Cited

U.S. PATENT DOCUMENTS 4,802,837 A * 2/1989 Held .................. B27N 3/08
                                            425/230
5,543,463 A * 8/1996 Kitaike ................ B32B 27/308
                                            526/320
(Continued)

FOREIGN PATENT DOCUMENTS

EP           0627469 A1    12/1994
JP           05-140244 A    6/1993
(Continued)

OTHER PUBLICATIONS

Machine translation (Espacenet) of JP 2002-080678 A. Translated Feb. 7, 2019. (Year: 2019).*
Machine translation (Espacenet) of JP 2003-292544 A. Translated Feb. 7, 2019. (Year: 2019).*
Extended European Search Report (EESR) issued in counterpart European Patent Application No. 14803739.3 dated Mar. 16, 2016.
Communication regarding Third Party Observations submitted against corresponding European Patent Application No. 14803739.3 dated Mar. 22, 2018.
Office Action issued in counterpart Korean Patent Application No. 10-2015-7033716 dated Sep. 25, 2017.
(Continued)

*Primary Examiner* — Maria V Ewald
*Assistant Examiner* — Ethan A. Utt
(74) *Attorney, Agent, or Firm* — Morgan, Lewis & Bockius LLP

(57) ABSTRACT

Provided is an acrylic resin laminate film which has an excellent bonding property, resistance to water blushing, and an excellent external appearance. This acrylic resin laminate film is provided with: an acrylic resin layer (I) comprising an acrylic resin composition (A); and an acrylic resin layer (II) comprising a resin composition (B) that contains a reactive group-containing acrylic resin (B-1). (B) contains 10-100 mass % of (B-1), and 0-90 mass % of (B-2), which is an acrylic resin other than (B-1), with respect to 100 mass % of the total of (B-1), and (B-2), and further contains 0-50 parts by mass of (C), which is an additive other than (B-1), and (B-2), with respect to 100 parts by mass of the total of (B-1), and (B-2). (B-1) contains a monomer unit which has a substituent that reacts with an amino group, or a methylol group. The content of the monomer unit that has the reactive substituent is 3 mass % or more with respect to 100 mass % of (B).

19 Claims, No Drawings

(51) Int. Cl.
*B32B 27/42* (2006.01)
*B29C 48/08* (2019.01)
*B29C 48/21* (2019.01)
*B29C 48/00* (2019.01)
*B29C 65/00* (2006.01)
*B32B 37/18* (2006.01)
*C08J 7/04* (2006.01)
*B29K 33/00* (2006.01)
*B29K 633/04* (2006.01)
*B29K 679/00* (2006.01)

(52) U.S. Cl.
CPC ........... *B29C 48/21* (2019.02); *B29C 66/45* (2013.01); *B29C 66/712* (2013.01); *B32B 27/08* (2013.01); *B32B 27/42* (2013.01); *B32B 37/18* (2013.01); *C08J 7/047* (2013.01); *B29K 2033/00* (2013.01); *B29K 2633/08* (2013.01); *B29K 2679/00* (2013.01); *B32B 2250/24* (2013.01); *B32B 2333/08* (2013.01); *B32B 2379/00* (2013.01); *B32B 2571/00* (2013.01); *B32B 2590/00* (2013.01); *C08J 2333/00* (2013.01); *C08J 2433/00* (2013.01); *Y10T 428/254* (2015.01); *Y10T 428/269* (2015.01); *Y10T 428/31928* (2015.04); *Y10T 428/31935* (2015.04)

(58) Field of Classification Search
CPC ........ C08F 20/146; C08F 20/18; C08F 22/00; C08F 22/10; C08F 22/105; C08F 120/00; C08F 120/02; C08F 120/04; C08F 120/06; C08F 120/10; C08F 120/12; C08F 120/146; C08F 120/18; C08F 120/105; C08F 2220/1808; C08F 2220/1618; C08F 2220/1825; C08F 2220/1833; C08F 2220/1841; C08F 2220/185; C08F 2220/1858; C08F 2220/1866; C08F 2220/1875; C08F 2220/1883; C08F 2220/1891; C08F 2220/105; C08F 265/00; C08F 265/04; C08J 2333/08; C08J 2333/10; C08J 2333/12; C08J 2333/00; C08J 2333/04; C08J 2333/06; C08J 2433/00; C08J 2433/06; C08J 2433/08; C08J 2433/10; C08J 2433/12
USPC ....... 428/500, 515, 520, 522, 212, 213, 214, 428/215, 216, 220, 332, 334, 335, 336, 428/337, 339, 343, 354, 355, 355 R, 428/355 EN, 355 AC; 526/328.5, 329, 526/329.1–329.7, 319–328, 317.1–318.6, 526/323.1, 323.2, 330, 331, 318, 318.1, 526/318.2, 318.25, 318.3, 318.4, 526/318.41–318.45, 318.5
See application file for complete search history.

(56) References Cited

U.S. PATENT DOCUMENTS

| | | | |
|---|---|---|---|
| 6,509,097 B1* | 1/2003 | Hatakeyama | B32B 27/308 428/523 |
| 6,652,985 B1 | 11/2003 | Tadokoro et al. | |
| 2006/0052539 A1* | 3/2006 | Noda | C09D 5/002 525/198 |
| 2006/0058460 A1* | 3/2006 | VanRheenen | B32B 27/08 525/70 |
| 2006/0110617 A1* | 5/2006 | Kitaike | B32B 27/08 428/522 |
| 2008/0038544 A1* | 2/2008 | Kitaike | B32B 27/308 428/500 |
| 2008/0311406 A1 | 12/2008 | Bonnet et al. | |
| 2010/0036030 A1* | 2/2010 | Schijndel | A63B 53/00 524/315 |
| 2011/0166293 A1 | 7/2011 | Dufaure et al. | |

FOREIGN PATENT DOCUMENTS

| | | | |
|---|---|---|---|
| JP | 09-272777 A | | 10/1997 |
| JP | 10-237261 A | | 9/1998 |
| JP | 2002080678 A | * | 3/2002 |
| JP | 2002-273835 A | | 9/2002 |
| JP | 2003292544 A | * | 10/2003 |
| JP | 2007-506574 A | | 3/2007 |
| JP | 2009-255555 A | | 11/2009 |
| JP | 2010-221513 A | | 10/2010 |
| JP | 2011-135017 A | | 7/2011 |
| JP | 2012-183724 A | | 9/2012 |
| JP | 2012-183725 A | | 9/2012 |
| KR | 10-0321869 B1 | | 8/2002 |

OTHER PUBLICATIONS

Office Action issued in counterpart Japanese Patent Application No. 2014-527390 dated Apr. 20, 2018.
Office Action issued in counterpart Japanese Patent Application No. 2014-527390 dated Jul. 3, 2018.
Office Action issued in counterpart European Patent Application No. 14803739.3 dated Jan. 3, 2019.

* cited by examiner

ACRYLIC RESIN LAMINATE FILM, MANUFACTURING METHOD THEREFOR, AND MELAMINE DECORATIVE BOARD

TECHNICAL FIELD

The present invention relates to an acrylic resin laminate film, a manufacturing method therefor, and a melamine decorative board.

BACKGROUND ART

Since an acrylic resin film is excellent in transparency and weather resistance and also has a high surface hardness, it is preferably used as a film which is bonded to, for example, various molding products for indoor or outdoor applications such as optical components of electrical products, interior parts of automobiles, signboards, and building materials so as to protect a surface thereof. In addition, the surface of the acrylic resin film is subjected to surface treatment such as anti-reflection treatment or antifouling treatment and then is bonded to a molding product, and thus surface functions such as antireflection properties or antifouling properties can also be imparted to the molding product.

In a case where these acrylic resin films for bonding are bonded to base materials having poor adhesiveness with an acrylic resin, when an adhesive, a primer, or the like is used, the number of processes increases and time and effort is required, which is disadvantageous in terms of costs. For this reason, an acrylic resin film to which adhesiveness is imparted by, for example, introducing a reactive substituent into the acrylic resin film has been developed.

For example, Patent Document 1 discloses a film with excellent adhesiveness which contains a polymer containing a monomer having a reactive substituent as a copolymer component. In addition, Patent Documents 2 and 3 disclose an acrylic resin film formed by a polymer having a hydroxyl group.

CITATION LIST

Patent Document

Patent Document 1: JP 2007-506574 W
Patent Document 2: JP 5-140244 A
Patent Document 3: JP 2002-273835 A

DISCLOSURE OF THE INVENTION

Problem to be Solved by the Invention

However, in a case where a reactive substituent is introduced in order to impart adhesiveness with a base material, water whitening resistance or appearance of the acrylic resin film may not be sufficient in some cases. In addition, when the water whitening resistance or the appearance is tried to be enhanced, adhesiveness may not be sufficient in some cases. In this regard, an object of the present invention is to provide an acrylic resin laminate film which is excellent in bondability, water whitening resistance, and appearance.

Means for Solving Problem

The present inventors conducted extensive studies, and as a result, have found that the above-described object can be achieved by combining two kinds of acrylic resin layers each having a specific composition, whereby the present invention has been accomplished. That is, the present invention is the invention according to the following [1] to [15].

[1] An acrylic resin laminate film comprising:
an acrylic resin layer (I) composed of an acrylic resin composition (A); and
an acrylic resin layer (II) composed of a resin composition (B) containing a reactive group-containing acrylic resin (B-1), in which
the resin composition (B) contains 10 to 100% by mass of the reactive group-containing acrylic resin (B-1) and 0 to 90% by mass of an acrylic resin (B-2) other than (B-1) with respect to 100% by mass of (B-1) and (B-2) in total, and further contains 0 to 50 parts by mass of an additive (C) other than (B-1) and (B-2) with respect to 100 parts by mass of (B-1) and (B-2) in total,
the reactive group-containing acrylic resin (B-1) contains a monomer unit having a reactive substituent with respect to an amino group or a methylol group, and
a content of the monomer unit having a reactive substituent is 3% by mass or more with respect to 100% by mass of the resin composition (B).

[2] The acrylic resin laminate film described in [1], in which the reactive substituent is a hydroxyl group.

[3] The acrylic resin laminate film described in [1] or [2], in which the reactive substituent is a secondary hydroxyl group.

[4] An acrylic resin laminate film comprising:
an acrylic resin layer (I) composed of an acrylic resin composition (A); and
an acrylic resin layer (II) composed of a resin composition (B) containing a reactive group-containing acrylic resin (B-1), in which
the resin composition (B) contains 10 to 100% by mass of the reactive group-containing acrylic resin (B-1) and 0 to 90% by mass of an acrylic resin (B-2) other than (B-1) with respect to 100% by mass of (B-1) and (B-2) in total, and further contains 0 to 50 parts by mass of an additive (C) other than (B-1) and (B-2) with respect to 100 parts by mass of (B-1) and (B-2) in total,
the reactive group-containing acrylic resin (B-1) contains a monomer unit having a hydroxyl group, and
a hydroxyl value of the resin composition (B) is 15 to 300 mgKOH/g.

[5] The acrylic resin laminate film described in any one of [1] to [4], in which the acrylic resin composition (A) contains acrylic rubber particles (A-1).

[6] The acrylic resin laminate film described in any one of [1] to [5], in which a glass-transition temperature of the reactive group-containing acrylic resin (B-1) is 0 to 90° C.

[7] The acrylic resin laminate film described in any one of [1] to [6], in which a content of an aromatic vinyl monomer unit in the reactive group-containing acrylic resin (B-1) is 0 to 3% by mass with respect to 100% by mass of the reactive group-containing acrylic resin (B-1).

[8] The acrylic resin laminate film described in any one of [1] to [7], in which the resin composition (B) is composed of the reactive group-containing acrylic resin (B-1) and the additive (C).

[9] The acrylic resin laminate film described in any one of [1] to [8], in which a thickness of the film is 100 μm or less.

[10] The acrylic resin laminate film described in any one of [1] to [9], in which a thickness of the acrylic resin layer (II) is 30 μm or less.

[11] A method for manufacturing the acrylic resin laminate film described in any one of [1] to [10], the method utilizing a co-extrusion method in manufacturing of the acrylic resin laminate film.

[12] A method for manufacturing the acrylic resin laminate film described in any one of [1] to [10], the method utilizing a coating method in manufacturing of the acrylic resin laminate film.

[13] Use of the acrylic resin laminate film described in any one of [1] to [10] as a protective film.

[14] Use of the acrylic resin laminate film described in any one of [1] to [10] as a film for melamine decorative board surface protection.

[15] A melamine decorative board including the acrylic resin laminate film described in any one of [1] to [10] and a melamine base material laminated in the order of an acrylic resin layer (I), an acrylic resin layer (II), and the melamine base material.

Effect of the Invention

According to the present invention, it is possible to provide an acrylic resin laminate film which is excellent in bondability, water whitening resistance, and appearance.

MODE(S) FOR CARRYING OUT THE INVENTION

[Acrylic Resin Laminate Film]

An acrylic resin laminate film according to the present invention includes an acrylic resin layer (I) composed of an acrylic resin composition (A) and an acrylic resin layer (II) composed of a resin composition (B) containing a reactive group-containing acrylic resin (B-1). Here, the resin composition (B) constituting the acrylic resin layer (II) has a reactive substituent for exhibiting adhesiveness with a base material. For this reason, in a case where the acrylic resin laminate film according to the present invention is used for bonding application, it is preferable that the acrylic resin layer (II) composed of the resin composition (B) be used as a bonding layer facing a body to be bonded and the acrylic resin layer (I) composed of the acrylic resin composition (A) be used as a surface layer facing a side opposite to the body to be bonded.

[Acrylic Resin Composition (A)]

First, the acrylic resin composition (A) constituting the acrylic resin layer (I) will be described.

From the viewpoint of film productivity and handleability, the acrylic resin composition (A) preferably contains acrylic rubber particles (A-1), and can contain, for example, the acrylic rubber particles (A-1), a thermoplastic polymer (A-2), and an additive (C). In particular, it is preferable that the acrylic resin composition (A) contain 5.5 to 100% by mass of (A-1) and 0 to 94.5% by mass of (A-2) with respect to 100% by mass of (A-1) and (A-2) in total, and further contain 0 to 20 parts by mass of the additive (C) with respect to 100 parts by mass of (A-1) and (A-2) in total.

When the content of the acrylic rubber particles (A-1) is 5.5% by mass or more, toughness is further imparted to the acrylic resin layer (I) and thus the breakage of the film is less likely to occur in production of the acrylic resin laminate film, which results in good productivity. Further, handleability in the use of the acrylic resin laminate film is favorable. The acrylic resin composition (A) more preferably contains 10 to 100% by mass of (A-1) and 0 to 90% by mass of (A-2) with respect to 100% by mass of (A-1) and (A-2) in total and further preferably contains 15 to 100% by mass of (A-1) and 0 to 85% by mass of (A-2). In addition, the acrylic resin composition (A) more preferably contains 0.1 to 10 parts by mass of the additive (C) with respect to 100 parts by mass of (A-1) and (A-2) in total, and further preferably contains 1 to 8 parts by mass of the additive (C). Incidentally, the acrylic resin composition (A) may not contain the thermoplastic polymer (A-2) and the additive (C).

[Acrylic Rubber Particles (A-1)]

The acrylic rubber particles (A-1) are not particularly limited as long as they are particles containing an acrylic resin. However, the acrylic rubber particles (A-1) are preferably acrylic rubber particles having a multilayer structure of two or more layers in which a layer containing a hard polymer (a-2) as an outer layer is formed on a layer containing an elastic copolymer (a-1) as an inner layer.

In particular, the acrylic rubber particles (A-1) are preferably acrylic rubber particles having a multilayer structure of two or more layers in which a layer containing a hard polymer (a-2), as an outer layer, which has a structure of one or two or more layers obtained by graft polymerizing a monomer having methacrylic acid alkyl ester as a main component, is formed on a layer containing an elastic copolymer (a-1), an an inner layer, which has a structure of one or two or more layers obtained by using (meth)acrylic acid alkyl ester as a main component.

Further, the acrylic rubber particles (A-1) may include one or more layers containing an intermediate polymer (a-3) between the layer containing an elastic copolymer (a-1) and the layer containing a hard polymer (a-2).

The content of the elastic copolymer (a-1) in the acrylic rubber particles (A-1) is preferably 10 to 90% by mass and more preferably 20 to 70% by mass. The content of the hard polymer (a-2) in the acrylic rubber particles (A-1) is preferably 10 to 90% by mass and more preferably 30 to 70% by mass. The content of the intermediate polymer (a-3) in the acrylic rubber particles (A-1) is preferably 0 to 35% by mass and more preferably 0 to 20% by mass. Further, when the content is 35% by mass or less, the balance of a final polymer becomes favorable.

The elastic copolymer (a-1) is preferably a polymer obtained by polymerizing a monomer composition containing (meth)acrylic acid alkyl ester. Incidentally, (meth)acrylic acid represents acrylic acid or methacrylic acid. The elastic copolymer (a-1) is more preferably a polymer obtained by polymerizing a monomer composition containing acrylic acid alkyl ester.

The monomer composition may further contain a monomer other than (meth)acrylic acid alkyl ester and a crosslinkable monomer. For example, the elastic copolymer (a-1) can contain 80 to 100% by mass of acrylic acid alkyl ester having an alkyl group with 1 to 8 carbon atoms and methacrylic acid alkyl ester having an alkyl group with 1 to 4 carbon atoms, 0 to 20% by mass of the monomer other than (meth)acrylic acid alkyl ester, and 0 to 10% by mass of the crosslinkable monomer (100% by mass in total).

As the acrylic acid alkyl ester having an alkyl group with 1 to 8 carbon atoms, for example, methyl acrylate, ethyl acrylate, propyl acrylate, butyl acrylate, 2-ethylhexyl acrylate, and n-octyl acrylate are preferable, and acrylic acid alkyl ester with a low Tg is more preferable. These may be used alone or in combination of two or more kinds thereof.

The acrylic acid alkyl ester is used as a main component of the monomer constituting the elastic copolymer (a-1). Specifically, the used amount of the acrylic acid alkyl ester is preferably 30 to 99.9% by mass with respect to all monomers constituting the elastic copolymer (a-1). When the used amount is 30% by mass or more, moldability of a film is favorable. The used amount is more preferably 50 to 95% by mass.

Incidentally, in a case where the elastic copolymer (a-1) has a structure of two or more layers, the used amount range indicates the used amount of the acrylic acid alkyl ester in the entire elastic copolymer (a-1). For example, in a case where the elastic copolymer (a-1) has a hard core structure, the used amount of the acrylic acid alkyl ester in the first layer (core portion) can also be set to less than 30% by mass.

Examples of the methacrylic acid alkyl ester having an alkyl group with 1 to 4 carbon atoms include methyl methacrylate, ethyl methacrylate, propyl methacrylate, and butyl methacrylate. These may be used alone or in combination of two or more kinds thereof. The used amount of the methacrylic acid alkyl ester is preferably 0 to 69.9% by mass and more preferably 0 to 40% by mass with respect to all monomers constituting the elastic copolymer (a-1).

As the monomer other than (meth)acrylic acid alkyl ester, other vinyl monomers copolymerizable with the (meth) acrylic acid alkyl ester are exemplified. Examples of the monomer other than (meth)acrylic acid alkyl ester include styrene and acrylonitrile. These may be used alone or in combination of two or more kinds thereof. In a case where the monomer other than (meth)acrylic acid alkyl ester is used, the used amount thereof is preferably 0 to 69.9% by mass and more preferably 0 to 20% by mass with respect to all monomers constituting the elastic copolymer (a-1).

Examples of the crosslinkable monomer include ethylene glycol dimethacrylate, 1,3-butylene glycol dimethacrylate, 1,4-butylene glycol dimethacrylate, propylene glycol dimethacrylate, and a graft crosslinking agent. These may be used alone or in combination of two or more kinds thereof. The used amount of the crosslinkable monomer is preferably 0.1 to 10% by mass and more preferably 0.5 to 5% by mass with respect to all monomers constituting the elastic copolymer (a-1). From the viewpoint of stability of the acrylic rubber particles (A-1), a graft crosslinking agent is preferably used as the crosslinkable monomer.

Examples of the graft crosslinking agent include an allyl ester, methallyl ester, or crotyl ester of α,β-unsaturated carboxylic acid or unsaturated dicarboxylic acid; triallyl cyanurate; and triallyl isocyanurate. Among these, an allyl ester of acrylic acid, methacrylic acid, maleic acid, fumaric acid, or the like is preferable and, from the viewpoint of having an excellent effect, allyl methacrylate is more preferable.

In such a graft crosslinking agent, mainly, a conjugated unsaturated bond of an ester thereof reacts and forms a chemical bond far faster than an allyl group, a methallyl group, or a crotyl group. Further, most of an allyl group, a methallyl group, or a crotyl group, which reacts slowly, acts effectively in polymerization of a next-layer polymer and forms a graft bond between two adjacent layers.

The hard polymer (a-2) is preferably a polymer obtained by polymerizing methacrylic acid alkyl ester, acrylic acid alkyl ester, and a monomer other than (meth)acrylic acid alkyl ester. For example, the hard polymer (a-2) is obtained by polymerizing, in the presence of the elastic copolymer (a-1), a monomer composed of 51 to 100% by mass of the methacrylic acid alkyl ester having an alkyl group with 1 to 4 carbon atoms and 0 to 49% by mass of the acrylic acid alkyl ester having an alkyl group with 1 to 8 carbon atoms or the monomer other than (meth)acrylic acid alkyl ester. As the methacrylic acid alkyl ester having an alkyl group with 1 to 4 carbon atoms, the acrylic acid alkyl ester having an alkyl group with 1 to 8 carbon atoms, and the monomer other than (meth)acrylic acid alkyl ester, the same monomers as the monomers used in polymerization of the elastic copolymer (a-1) can be used.

The intermediate polymer (a-3) is preferably a polymer obtained by polymerizing a monomer composition containing acrylic acid alkyl ester, methacrylic acid alkyl ester, a monomer other than (meth)acrylic acid alkyl ester, and a crosslinkable monomer. The intermediate polymer (a-3) is more preferably a polymer obtained by polymerizing a monomer composition containing acrylic acid alkyl ester having an alkyl group with 1 to 8 carbon atoms, methacrylic acid alkyl ester having an alkyl group with 1 to 4 carbon atoms, a monomer other than (meth)acrylic acid alkyl ester, and a crosslinkable monomer. For example, the intermediate polymer (a-3) can contain 10 to 90% by mass of the acrylic acid alkyl ester having an alkyl group with 1 to 8 carbon atoms, 90 to 10% by mass of the methacrylic acid alkyl ester having an alkyl group with 1 to 4 carbon atoms, 0 to 20% by mass of the monomer other than (meth)acrylic acid alkyl ester, and 0 to 10% by mass of the crosslinkable monomer (100% by mass in total).

The same monomers as the monomers used in polymerization of the elastic copolymer (a-1) can be used as the respective monomers used in the intermediate polymer (a-3). Further, the content (monomer composition ratio) of the acrylic acid alkyl ester in the intermediate polymer (a-3) is preferably lower than the content of the acrylic acid alkyl ester in the elastic copolymer (a-1) and higher than the content of the acrylic acid alkyl ester in the hard polymer (a-2).

The average particle diameter of the acrylic rubber particles (A-1) is preferably 0.01 to 0.5 μm and more preferably 0.08 to 0.3 μm. In particular, from the viewpoint of film formability, the average particle diameter is preferably 0.08 μm or more. Incidentally, the average particle diameter is a value measured by a method to be described later.

A method for producing the acrylic rubber particles (A-1) is not particularly limited. As a method for producing the elastic copolymer (a-1) and the hard polymer (a-2), for example, an emulsion polymerization method can be used. Further, the elastic copolymer (a-1) and the hard polymer (a-2) can also be produced by emulsion suspension polymerization of performing emulsion polymerization and then performing conversion into a suspension polymerization system in polymerization of a polymer constituting an outermost layer. The polymerization temperature is appropriately selected depending on kinds of a polymerization initiator to be used or an amount thereof, but is preferably 40 to 120° C. and more preferably 60 to 95° C. A well-known polymerization initiator can be used as a polymerization initiator. The polymerization initiator can be added to one or both of a water phase and a monomer phase.

Examples of an emulsifier which can be used in the emulsion polymerization method include anionic, cationic, and nonionic surfactants, but the anionic surfactant is preferable. Examples of the anionic surfactant include carboxylate-based surfactants such as potassium oleate, sodium stearate, sodium myristate, sodium N-lauroyl sarcosinate, and dipotassium alkenylsuccinate; sulfuric ester salt-based surfactants such as sodium lauryl sulfate; sulfonate-based surfactants such as sodium dioctyl sulfosuccinate, sodium dodecylbenzenesulfonate, and sodium alkyl diphenyl ether disulfonate; and phosphate salt-based surfactants such as sodium polyoxyethylene alkyl phenyl ether phosphate. These may be used alone or in combination of two or more kinds thereof.

A polymer latex obtained by emulsion polymerization can be filtrated with, for example, a filter having an aperture of 100 μm or less and then separated and recovered by a method such as an acid coagulation method, a salt coagulation method, a freezing coagulation method, or a spray drying method. In the acid coagulation method, an inorganic acid such as sulfuric acid, hydrochloric acid, or phosphoric acid and an organic acid such as acetic acid can be used. In the salt coagulation method, an inorganic salt such as sodium sulfate, magnesium sulfate, aluminum sulfate, or calcium chloride and an organic salt such as calcium acetate or magnesium acetate can be used. These may be used alone or in combination of two or more kinds thereof. The separated and recovered polymer is further washed, dehydrated, dried, or the like to thereby obtain the acrylic rubber particles (A-1).

[Thermoplastic Polymer (A-2)]

The thermoplastic polymer (A-2) is a thermoplastic polymer other than the acrylic rubber particles (A-1) and is preferably a polymer obtained by using methacrylic acid alkyl ester as a main component. The thermoplastic polymer (A-2) is more preferably a polymer obtained by polymerizing methacrylic acid alkyl ester, acrylic acid alkyl ester, and a monomer other than (meth)acrylic acid alkyl ester. For example, as the thermoplastic polymer (A-2), a polymer obtained by polymerizing 50 to 99.9% by mass of the methacrylic acid alkyl ester having an alkyl group with 1 to 4 carbon atoms, 0.1 to 50% by mass of the acrylic acid alkyl ester, and 0 to 49.9% by mass of the monomer other than (meth)acrylic acid alkyl ester (100% by mass in total) can be used.

Examples of the methacrylic acid alkyl ester include methyl methacrylate, ethyl methacrylate, and butyl methacrylate. Among them, methyl methacrylate is preferable. These may be used alone or in combination of two or more kinds thereof.

Examples of the acrylic acid alkyl ester include methyl acrylate, ethyl acrylate, and butyl acrylate. These may be used alone or in combination of two or more kinds thereof.

Examples of the monomer other than (meth)acrylic acid alkyl ester include aromatic vinyl monomers such as styrene, vinyl cyanide monomers such as acrylonitrile, unsaturated dicarboxylic acid anhydrides such as maleic anhydride and itaconic acid anhydride, N-phenylmaleimide, and N-cyclohexyl maleimide. These may be used alone or in combination of two or more kinds thereof.

A method for producing the thermoplastic polymer (A-2) is not particularly limited, but for example, various polymerization methods such as suspension polymerization, emulsion polymerization, and bulk polymerization can be used. A chain transfer agent, another polymerization aid, or the like may be used in polymerization. The chain transfer agent is not particularly limited, but is preferably mercaptans.

The mass average molecular weight of the thermoplastic polymer (A-2) is preferably 300,000 or less from the viewpoint of generating proper stretch when a film raw material resin is melted and having favorable film formability. In addition, the mass average molecular weight is preferably 10,000 or more from the viewpoint that breakage of the film is less likely to occur at the time of forming and handling the film since the film does not become fragile. Incidentally, the mass average molecular weight is a value measured by a method to be described later.

[Additive (C)]

The additive (C) is a compound other than the acrylic rubber particles (A-1) and the thermoplastic polymer (A-2), and examples thereof include a stabilizer, a lubricant, a processing aid, a plasticizer, an impact resistance improver, a foaming agent, a filler, a colorant, and an ultraviolet absorber.

Among them, a processing aid is preferable as the additive (C), from the viewpoint of securing the film formability. The processing aid is not particularly limited, but a processing aid composed of a thermoplastic polymer is preferable and a polymer obtained by polymerizing methyl methacrylate and a monomer other than methyl methacrylate is more preferable.

As the processing aid, for example, a polymer obtained by polymerizing 50 to 100% by mass of methyl methacrylate and 0 to 50% by mass of the monomer other than methyl methacrylate (100% by mass in total) can be used. When the processing aid is used, the film formability is improved. Therefore, the processing aid is effective particularly in a case where a high level of thickness accuracy or speed of film formation is necessary.

The mass average molecular weight of the processing aid composed of a thermoplastic polymer is preferably 400,000 or more, more preferably 500,000 to 5,000,000, and further preferably 700,000 to 2,000,000, from the viewpoint of obtaining a film with favorable thickness accuracy. Incidentally, the mass average molecular weight is a value obtained by a method to be described later.

Examples of the monomer other than methyl methacrylate include acrylic acid alkyl ester, methacrylic acid alkyl ester other than methyl methacrylate, an aromatic vinyl monomer, and a vinyl cyanide monomer. These may be used alone or in combination of two or more kinds thereof.

As a method for producing the processing aid composed of a thermoplastic polymer, an emulsion polymerization method is preferable. The processing aid composed of a thermoplastic polymer can be obtained, for example, in such a manner that a polymer latex produced by an emulsion polymerization method is separated and recovered by using various coagulating agents or the solid content thereof is separated and recovered by spray drying.

The used amount of the processing aid is preferably 0 to 20 parts by mass with respect to 100 parts by mass of the acrylic rubber particles (A-1) and the thermoplastic polymer (A-2) in total. When the used amount is 20 parts by mass or less, the viscosity of the acrylic resin composition (A) becomes proper and thus favorable film formability is achieved.

Further, from the viewpoint of imparting weather resistance for the purpose of protecting a base material, the additive (C) is preferably an ultraviolet absorber. The molecular weight of the ultraviolet absorber is preferably 300 or more and more preferably 400 or more. When the molecular weight is 300 or more, the ultraviolet absorber is less likely to volatilize when vacuum molding or air-pressure molding is performed in an injection mold and mold contamination is less likely to occur. The kind of the ultraviolet absorber is not particularly limited, but a benzotriazole-based ultraviolet absorber having a molecular weight of 400 or more and a triazine-based ultraviolet absorber having a molecular weight of 400 or more are preferable. As the benzotriazole-based ultraviolet absorber having a molecular weight of 400 or more, commercially available products such as "Tinuvin 234" (trade name, manufactured by Ciba-Geigy Japan Limited) and "Adekastab LA-31" (trade name, manufactured by ADEKA CORPORATION) are exemplified. As the triazine-based ultraviolet absorber having a molecular weight of 400 or more, commercially available products such as "Tinuvin 1577" (trade name, manufactured by Ciba-Geigy Japan Limited) are exemplified. These may be used alone or in combination of two or more kinds thereof. The added amount of the ultraviolet absorber is preferably 0 to 20 parts by mass and more preferably 1 to 5 parts by mass with respect to 100 parts by mass of the acrylic rubber particles (A-1) and the thermoplastic polymer (A-2) in total, from the viewpoint of weather resistance.

Further, from the viewpoint of further improving weather resistance, it is preferable to use a radical scavenger such as a hindered amine light stabilizer together with an ultraviolet absorber. Examples of commercially available products as the radical scavenger include "Adekastab LA-57," "Adekastab LA-62," "Adekastab LA-67," "Adekastab LA-63," and "Adekastab LA-68" (these are all trade names, manufactured by ADEKA CORPORATION); and "Sanol LS-770," "Sanol LS-765," "Sanol LS-292," "Sanol LS-2626," "Sanol LS-1114," and "Sanol LS-744" (these are all trade names, manufactured by Sankyo Life Tech Co., Ltd.). These may be used alone or in combination of two or more kinds thereof. The added amount of the radical scavenger is preferably 0 to 10 parts by mass and more preferably 0.2 to 5 parts by mass with respect to 100 parts by mass of the acrylic rubber particles (A-1) and the thermoplastic polymer (A-2) in total, from the viewpoint of bleed-out resistance.

[Resin Composition (B)]

Next, the resin composition (B) constituting the acrylic resin layer (II) will be described. The resin composition (B) is expressed by (1) or (2) described below.

(1): The resin composition (B) contains 10 to 100% by mass of the reactive group-containing acrylic resin (B-1) and 0 to 90% by mass of the acrylic resin (B-2) other than (B-1) with respect to 100% by mass of (B-1) and (B-2) in total, and further contains 0 to 50 parts by mass of the additive (C) other than (B-1) and (B-2) with respect to 100% by mass of (B-1) and (B-2) in total, the reactive group-containing acrylic resin (B-1) contains a monomer unit having a reactive substituent with respect to an amino group or a methylol group, and the content of the monomer unit having a reactive substituent is 3% by mass or more with respect to 100% by mass of the resin composition (B).

(2): The resin composition (B) contains 10 to 100% by mass of the reactive group-containing acrylic resin (B-1) and 0 to 90% by mass of the acrylic resin (B-2) other than (B-1) with respect to 100% by mass of (B-1) and (B-2) in total, and further contains 0 to 50 parts by mass of the additive (C) other than (B-1) and (B-2) with respect to 100% by mass of (B-1) and (B-2) in total, the reactive group-containing acrylic resin (B-1) contains a monomer unit having a hydroxyl group, and the hydroxyl value of the resin composition (B) is 15 to 300 mgKOH/g.

However, since side reaction may occur in some cases when the content of the monomer unit having a reactive substituent in the reactive group-containing acrylic resin (B-1) is high, the balance between improvement in adhesiveness and suppression in side reaction can be achieved by decreasing the content of the monomer unit having a reactive substituent in the reactive group-containing acrylic resin (B-1) so as to increase the content of the acrylic resin (B-1) in the resin composition (B). From the viewpoint of productivity, the resin composition (B) can also be composed of only the reactive group-containing acrylic resin (B-1).

In the above description (1) and the above description (2), the resin composition (B) preferably contains 20 to 100% by mass of (B-1) and 0 to 80% by mass of (B-2) with respect to 100% by mass of (B-1) and (B-2) in total, more preferably contains 40 to 100% by mass of (B-1) and 0 to 60% by mass of (B-2), and further preferably contains 60 to 100% by mass of (B-1) and 0 to 40% by mass of (B-2). Further, the resin composition (B) preferably contains 0 to 10 parts by mass of the additive (C) with respect to 100 parts by mass of (B-1) and (B-2) in total, more preferably contains 0.1 to 5 parts by mass of the additive (C), and further preferably contains 0.1 to 3 parts by mass of the additive (C).

Further, in the above description (1) and the above description (2), the resin composition (B) is preferably composed of the reactive group-containing acrylic resin (B-1) and the additive (C), that is, does not contain the acrylic resin (B-2) other than (B-1) and is composed of only the reactive group-containing acrylic resin (B-1) and additive (C), from the viewpoint of productivity. Incidentally, the resin composition (B) may not contain the acrylic resin (B-2) other than (B-1) and the additive (C).

In the above description (1), the reactive group-containing acrylic resin (B-1) contains the monomer unit having a reactive substituent with respect to an amino group or a methylol group, and the content of the monomer unit is 3% by mass or more with respect to 100% by mass of the resin composition (B). When 3% by mass or more of the monomer unit having a reactive substituent is contained, favorable adhesiveness is achieved. From the viewpoint of achieving more favorable adhesiveness, the monomer unit having a reactive substituent is contained in 5% by mass or more, and more preferably 10% by mass or more. The upper limit of the content of the monomer unit having a reactive substituent is not particularly limited, but can be set to 50% by mass or less. Incidentally, this content is a value calculated from the supplied amount of the raw materials.

In the above description (2), the reactive group-containing acrylic resin (B-1) contains the monomer unit having a hydroxyl group and the hydroxyl value of the resin composition (B) is 15 to 300 mgKOH/g. When the hydroxyl value is 15 mgKOH/g or more, favorable adhesiveness is achieved. When the hydroxyl value is 300 mgKOH/g or less, the water absorbability of the resin composition (B) is lowered and the water resistance of the acrylic resin laminate film and the melamine decorative board having the acrylic resin laminate film laminated thereon is improved. From the viewpoint of adhesiveness and water resistance, the hydroxyl value is more preferably 20 to 120 mgKOH/g and further preferably 25 to 80 mgKOH/g. Incidentally, the hydroxyl value is a value calculated by a method to be described later.

The glass-transition temperature (Tg) of the reactive group-containing acrylic resin (B-1) is preferably 0 to 90° C., more preferably 15 to 80° C., further preferably 30 to 75° C., and particularly preferably 30 to 70° C. When the Tg is 0° C. or higher, films can be prevented from sticking to each other at the time of producing or handling the films, and thus workability is favorable. In addition, the heat resistance of the melamine decorative board using the acrylic resin laminate film according to the present invention is favorable. Furthermore, when the Tg is 90° C. or lower, adhesiveness with the melamine base material becomes more favorable. Incidentally, the Tg can be obtained using a numerical value of the Tg of a homopolymer of a component constituting the reactive group-containing acrylic resin (B-1) by FOX equation. The FOX equation is described below.

$$1/(273+Tg) = \Sigma(w_i/(273+Tg_i))$$

In the equation, Tg represents Tg (° C.) of a copolymer (or a mixture thereof), $w_i$ represents the mass fraction of a monomer i, and $Tg_i$ represents Tg (° C.) of a homopolymer obtained by polymerizing the monomer i.

Here, the numerical value described in POLYMER HANDBOOK THIRD EDITION (WILEY INTERSCIENCE) is used as the numerical value of Tg of the homopolymer. Incidentally, in a case where the monomer contains a crosslinkable monomer, Tg is obtained for the monomer excluding the crosslinkable monomer.

[Reactive Group-Containing Acrylic Resin (B-1)]

The reactive group-containing acrylic resin (B-1) is not particularly limited as long as it contains the monomer unit having a specific reactive substituent in the above description (1) or (2). The reactive group-containing acrylic resin (B-1) can contain, for example, a monomer unit having a reactive substituent, an aromatic vinyl monomer unit, and a monomer unit other than the monomer unit having a reactive substituent and the aromatic vinyl monomer unit. Specifically, the reactive group-containing acrylic resin (B-1) can contain 3 to 100% by mass of the monomer unit having a reactive substituent, 0 to 3% by mass of the aromatic vinyl monomer unit, and 0 to 97% by mass of the monomer unit other than the monomer unit having a reactive substituent and the aromatic vinyl monomer unit (100% by mass in total).

Since the reactive group-containing acrylic resin (B-1) contains the monomer unit having a reactive substituent, such as a hydroxyl group, with respect to an amino group or a methylol group, the reactive group-containing acrylic resin (B-1) can be attached to the melamine decorative board by performing heating reaction in a state where the reactive group-containing acrylic resin (B-1) is brought into contact with a material containing methylolmelamine and a derivative thereof, specifically, a melamine resin of the melamine decorative board or a precursor thereof.

Examples of the reactive substituent with respect to an amino group or a methylol group include a hydroxyl group, a carboxyl group, an amino group, an amide group, an acid anhydride group, an imide group, and an epoxy group. The reactive group-containing acrylic resin (B-1) may have one or two or more kinds of these reactive substituents. The reaction temperature of the reactive substituent varies depending on existence of a catalyst, a pH value, or the like, but is preferably 50 to 200° C., and more preferably 110 to 170° C. Since the melamine decorative board is generally manufactured at a temperature of 110 to 170° C., when the reaction temperature is 110 to 170° C., the acrylic resin laminate film according to the present invention is laminated on the melamine base material and then heated, and thus the acrylic resin laminate film according to the present invention can be sufficiently attached to the melamine base material at the same time of manufacturing the melamine decorative board.

Examples of the monomer having a reactive substituent include a monomer having a hydroxyl group such as (meth) acrylic acid hydroxyalkyl ester; a monomer having a carboxyl group such as (meth)acrylic acid, (meth)acryloyloxyalkyl carboxylic acid or (meth)acryloyloxy aromatic carboxylic acid; a monomer having an amino group such as (meth)acrylic acid aminoalkyl ester; a monomer having an amide group such as (meth)acrylic acid alkylamide alkyl ester; an acid anhydride monomer such as maleic anhydride; a maleimide monomer such as maleimide or alkylmaleimide; and an epoxy group-containing body such as glycidyl (meth)acrylate. These may be used alone or in combination of two or more kinds thereof. Among them, as the monomer having a reactive substituent, from the viewpoint of adhesiveness, a monomer having a hydroxyl group, a carboxyl group, an acid anhydride group, or an epoxy group as a reactive substituent is preferable. In addition, the monomer having a reactive substituent is more preferably a monomer having a hydroxyl group, a carboxyl group, or an epoxy group as a reactive substituent from the viewpoint that the monomer does not have a hydrolyzable portion such as an acid anhydride and a polymer can be produced efficiently in aqueous polymerization such as emulsion polymerization or suspension polymerization. Further, as the monomer having a reactive substituent, from the viewpoint of preventing cross linking in melt molding, the monomer having a hydroxyl group as a reactive substituent is further preferable. Furthermore, as the monomer having a reactive substituent, from the viewpoint of particularly reducing cross linking in melt molding, a monomer having a secondary hydroxyl group as a reactive substituent is particularly preferable.

As the monomer having a hydroxyl group as a reactive substituent, specifically, hydroxyethyl methacrylate, hydroxypropyl methacrylate, hydroxybutyl methacrylate, hydroxyethyl acrylate, hydroxypropyl acrylate, and hydroxybutyl acrylate are preferable. In particular, from the viewpoint that the film appearance can be prevented from being deteriorated due to the cross-linking reaction in melt molding, hydroxypropyl methacrylate is more preferable as the monomer having a hydroxyl group as a reactive substituent. These may be used alone or in combination of two or more kinds thereof.

The used amount of the monomer having a reactive substituent is not particularly limited, but is preferably 3 to 100% by mass with respect to the reactive group-containing acrylic resin (B-1). In addition, the used amount is more preferably 3 to 80% by mass from the viewpoint of adhesiveness and side reaction prevention. When the used amount is 3% by mass or more, adhesiveness becomes more favorable. Further, when the used amount is 80% by mass or less, the side reaction caused by the reactive substituent can be suppressed by concurrently using 20% by mass or more of a non-reactive monomer. In addition, when the monomer having a reactive substituent is water-soluble, dissolution in water can be suppressed by concurrently using a non-aqueous monomer, and a polymer can be produced efficiently in aqueous polymerization such as emulsion polymerization or suspension polymerization.

The used amount of the aromatic vinyl monomer is preferably 0 to 3% by mass with respect to the reactive group-containing acrylic resin (B-1). When the used amount is 3% by mass or less, weather resistance of an acrylic resin laminate film and a melamine decorative board to be obtained becomes favorable. The used amount is more preferably 0 to 1% by mass and more preferably 0 to 0.1% by mass. Incidentally, smaller used amount is preferable and the used amount may be 0% by mass.

As the monomer other than the monomer having a reactive substituent and the aromatic vinyl monomer, the same monomer as the monomer used in polymerization of the thermoplastic polymer (A-2) can be used, but from the viewpoint of compatibility with the acrylic resin (B-2) other than (B-1) and adhesion with the acrylic resin layer (I), an acrylic monomer, particularly, methyl methacrylate is preferable. The used amount of the monomer other than the monomer having a reactive substituent and the aromatic vinyl monomer is preferably 0 to 97% by mass with respect to the reactive group-containing acrylic resin (B-1), more preferably 0 to 90% by mass, and further preferably 0 to 85% by mass, from the viewpoint of suppressing the reaction of crosslinking or the like caused by the reactive substituent. Incidentally, the used amount may be 0% by mass.

A method for producing the reactive group-containing acrylic resin (B-1) is not particularly limited, but for example, various polymerization methods such as suspension polymerization, emulsion polymerization, bulk polymerization, and solution polymerization can be used. However, since hydrolysis occurs in polymerization in a case where a monomer having an acid anhydride and an imide structure is used as the monomer having a reactive substituent, the reactive group-containing acrylic resin (B-1) cannot be produced by aqueous polymerization such as suspension polymerization or emulsion polymerization. In polymerization, a chain transfer agent, another polymerization aid, or the like may be used. The chain transfer agent is not particularly limited, but is preferably mercaptans.

[Acrylic Resin (B-2) Other than (B-1)]

The acrylic resin (B-2) other than (B-1) is not particularly limited as long as it is an acrylic resin not containing a monomer unit having a reactive substituent. The structure of the acrylic resin (B-2) other than (B-1), the monomer to be used therefor, the production method therefor, and various physical properties thereof are the same as in the acrylic rubber particles (A-1) or the thermoplastic polymer (A-2).

[Additive (C)]

The same additive (C) as the additive (C) to be used in preparation of the acrylic resin composition (A) can be used as the additive (C) as long as it is an additive other than the reactive group-containing acrylic resin (B-1) and the acrylic resin (B-2) other than (B-1).

The thickness of the acrylic resin laminate film according to the present invention is preferably 100 µm or less, more preferably 10 to 100 µm, further preferably 20 to 75 µm, and particularly preferably 25 to 60 µm. When the thickness is 10 µm or more, the acrylic resin laminate film is easily manufactured and sufficient weather resistance can be imparted to a melamine decorative board to be obtained. On the other hand, when the thickness is 100 µm or less, the acrylic resin laminate film has proper flexibility and thus peeling can be prevented when a melamine decorative board to be obtained is cut. Further, in terms of mass per unit area, economic advantage is achieved. Moreover, the film formability becomes stable and thus the acrylic resin laminate film is easily manufactured.

The thickness of the acrylic resin layer (I) is preferably 5 to 99 µm, more preferably 10 to 55 µm, and further preferably 15 to 50 µm. When the thickness of the acrylic resin layer (I) is 5 µm or more, water resistance of a melamine decorative board to be obtained becomes favorable. In addition, when the thickness of the acrylic resin layer (I) is 99 µm or less, in terms of mass per unit area, economic advantage is achieved.

The thickness of the acrylic resin layer (II) is preferably 30 µm or less, more preferably 1 to 30 µm, further preferably 3 to 20 µm, and particularly preferably 4 to 10 µm. When the thickness of the acrylic resin layer (II) is 30 µm or less, water whitening resistance becomes favorable. In addition, when the thickness of the acrylic resin layer (II) is 1 µm or more, adhesiveness is improved. That is, when the thickness is within these ranges, sufficient water whitening resistance and adhesiveness can be secured, and thus an acrylic resin laminate film having a high industrial utility value is obtained.

As the method for manufacturing the acrylic resin laminate film according to the present invention, from the viewpoint of productivity, a method is preferable in which a laminate structure of the acrylic resin layers (I) and (II) is formed by a co-extrusion method through a feedblock die or a multi-manifold die. In addition, a method can also be used in which each of the acrylic resin layers (I) and (II) is formed in a film shape by a melt extrusion method using a T die and the two kinds of films are laminated by a thermal lamination method. Further, an extrusion lamination method can also be used in which one of the acrylic resin layers is formed in a film shape and then the other of the acrylic resin layers is laminated thereon by a melt extrusion method. In a case where melt extrusion is performed, in order to remove nuclei or impurities causing a surface defect, extrusion can also be performed while a resin composition in a molten state is filtrated using a screen mesh of 200 meshes or more.

Further, from the viewpoint of preventing thermal degradation of the resin composition (B), a coating method is preferably used in which a solution containing the resin composition (B) is applied onto the acrylic resin layer (I) formed in a film shape so as to laminate the acrylic resin layer (II). For example, a method is exemplified in which a solution obtained by dissolving the resin composition (B) in a solvent such as an organic solvent is applied onto the acrylic resin layer (I) by a printing method such as a gravure printing method, a screen printing method, or an offset printing method, or a coating method such as a blade coating method or a rod coating method, and heat drying is performed in order to remove the solvent. Incidentally, a solution containing the acrylic resin composition (A) may be applied onto the acrylic resin layer (II) formed in a film shape so as to laminate the acrylic resin layer (I).

Examples of the solvent include alcohol-based solvents such as methanol, ethanol, isopropanol, n-butanol, and ethylene glycol; aromatic solvents such as xylene, toluene, and benzene; aliphatic hydrocarbon-based solvents such as hexane and heptane; halogenated hydrocarbon-based solvents such as chloroform and carbon tetrachloride; phenol-based solvents such as phenol and cresol; ketone-based solvents such as methyl ethyl ketone, methyl isobutyl ketone, acetone, and cyclohexanone; ether-based solvents such as diethyl ether, methoxytoluene, 1,2-dimethoxyethane, 1,2-dibutoxyethane, 1,1-dimethoxymethane, 1,1-dimethoxyethane, 1,4-dioxane, and tetrahydrofuran (THF); fatty acid-based solvents such as formic acid, acetic acid, and propionic acid; acid anhydride-based solvents such as acetic anhydride; ester-based solvents such as ethyl acetate, n-propyl acetate, butyl acetate, and butyl formate; nitrogen-containing solvents such as ethylamine, toluidine, dimethylformamide, and dimethylacetamide; sulfur-containing solvents such as thiophene and dimethylsulfoxide; solvents having two or more functional groups such as diacetone alcohol, 2-methoxyethanol (methyl cellosolve), 2-ethoxyethanol (ethyl cellosolve), 2-butoxyethanol (butyl cellosolve), diethylene glycol, 2-aminoethanol, acetone cyanohydrin, diethanolamine, morpholine, 1-acetoxy-2-ethoxyethane, and 2-acetoxy-1-methoxypropane; and water. These may be alone or in combination of two or more kinds thereof.

An additive, such as an anti-skinning agent, a thickener, an anti-settling agent, an anti-dripping agent, a defoaming agent, or a leveling agent, for improving solution properties can be added to a resin composition depending on printability or coatability as a coating material. Further, an additive, such as an extender pigment, a light stabilizer, an ultraviolet absorber, an antioxidant, an antibacterial agent, a fungicide, or a flame retardant, for improving coating performance can be added to a resin composition.

[Protective Film, Film for Melamine Decorative Board Surface Protection, and Melamine Decorative Board]

Since the acrylic resin laminate film according to the present invention has excellent adhesiveness and can be attached to various base materials, it can be suitably used as a protective film. That is, the protective film according to the present invention can be formed by the acrylic resin laminate film according to the present invention. In particular, since the acrylic resin laminate film according to the present invention exhibits excellent adhesiveness with respect to a melamine resin, it can be suitably used as a film for melamine decorative board surface protection. That is, the film for melamine decorative board surface protection according to the present invention can be formed by the acrylic resin laminate film according to the present invention. In addition, the melamine decorative board according to the present invention includes the acrylic resin laminate film according to the present invention and the melamine base material laminated in the order of the acrylic resin layer (I), the acrylic resin layer (II), the melamine base material.

The melamine decorative board is used for a horizontal surface of a desk, a counter, or the like, and a vertical surface of a wall or the like, and the configuration thereof and manufacturing method therefor are specifically described in Decorative Board Handbook (Shin Kenzai Kenkyusho (New Building Material Laboratory), issued in 1973). These melamine decorative boards are obtained, for example, in such a manner that melamine resin-impregnated paper, which is obtained by impregnating decorative paper for a decorative board with a melamine resin and drying the paper, and resin-impregnated core paper as a core layer are laminated, and as necessary, melamine resin-impregnated overlaying paper, which is obtained by impregnating overlaying paper with a melamine resin and drying the paper, for the purpose of protecting the pattern of the decorative paper, and balance paper are laminated on the lowermost layer for the purpose of suppressing warpage, followed by being subjected to thermocompression molding.

As the melamine resin-impregnated paper, for example, resin-impregnated paper obtained by impregnating decorative paper for a decorative board with a melamine-formaldehyde resin and drying the paper can be used. As the resin-impregnated core paper, it is possible to use, for example, core paper for a decorative board obtained by impregnating craft paper, non-woven fabric, woven fabric, or the like with a slurry that contains a phenol-formaldehyde resin, a melamine-formaldehyde resin, or a resin liquid containing a mixture thereof as a main component, and an inorganic filler such as aluminum hydroxide or calcium carbonate, and then drying the paper or fabric. The thermocompression molding can be performed under the conditions including a temperature of 110 to 170° C., a pressure of 5 to 10 MPa, and a time of 10 to 90 minutes by laminating the resin-impregnated core paper, the melamine resin-impregnated paper (the melamine base material), and the acrylic resin laminate film.

In a case where the acrylic resin laminate film according to the present invention is bonded to the melamine base material, it is preferable to perform thermal fusion bonding while the acrylic resin laminate film comes into contact with the melamine base material such that the acrylic resin layer (II) composed of the resin composition (B) faces the melamine base material side. According to this method, the bonding can be performed without using an adhesive and a gluing agent. The bonding can be performed continuously or discontinuously, and for example, the bonding can be performed by a discontinuous bonding method using a hot pressing method. In particular, when the melamine decorative board is manufactured, if the melamine base material and the acrylic resin laminate film according to present invention are laminated and subjected to thermocompression molding, the acrylic resin laminate film can be laminated simultaneously with the manufacturing of the melamine decorative board, and thus the number of processes can be reduced, which is advantageous.

On the other hand, in a case where the acrylic resin laminate film according to the present invention is not used, but for example, a film composed of the acrylic resin layer (I) is used, the adhesiveness with the melamine base material is low. For this reason, it is necessary to use an adhesive or a primer, and thus the costs increase and productivity significantly decreases. In contrast, in a case where the acrylic resin laminate film according to the present invention is used, it is not necessary to use an adhesive or a primer, and thus the number of processes can be reduced and the costs can be reduced, which is industrially advantageous.

EXAMPLES

Hereinafter, the present invention will be described in more detail by means of Examples, but the present invention is not limited to these Examples. In Examples, "part(s)" represents "part(s) by mass." Further, abbreviations in Examples are as described below.

MMA: methyl methacrylate
MAA: methacrylic acid
BMA: butyl methacrylate
MA: methyl acrylate
BA: butyl acrylate
St: styrene
HEMA: 2-hydroxyethyl methacrylate
HPMA: 2-hydroxypropyl methacrylate
AMA: allyl methacrylate
1,3BD: 1,3-butylene glycol dimethacrylate
CHP: cumene hydroperoxide
t-BH: t-butyl hydroperoxide
t-HH: t-hexyl hydroperoxide
LPO: lauryl peroxide
n-OM: n-octylmercaptan
RS-610NA: sodium mono-n-dodecyloxytetraoxyethylene phosphate (trade name: "PHOSPHANOL RS-610NA," manufactured by TOHO CHEMICAL INDUSTRY Co., Ltd.)
LA-31: "Adekastab LA-31RG" (trade name) manufactured by ADEKA CORPORATION
LA-57: "Adekastab LA-57" (trade name) manufactured by ADEKA CORPORATION
TV234: "TINUVIN 234" (trade name) manufactured by BASF
TV1600: "TINUVIN 1600" (trade name) manufactured by BASF
Irg1076: "Irganox 1076" (trade name) manufactured by BASF
VH: "ACRYPET VH" (trade name) manufactured by MITSUBISHI RAYON CO., LTD.
MD: "ACRYPET MD" (trade name) manufactured by MITSUBISHI RAYON CO., LTD.

Various physical properties in Examples were measured according to the following methods.

(1) Mass Average Molecular Weight (Mw) and Molecular Weight Distribution

The mass average molecular weight (Mw) and the number average molecular weight of a polymer were obtained by the following method. The measurement was performed at 40° C. for a sample obtained by dissolving the polymer in tetrahydrofuran by using a gel permeation chromatography (model name: "HLC-8200," manufactured by Tosoh Corporation), a column (trade name: "TSK-GEL SUPER MULTIPORE HZ-H," manufactured by Tosoh Corporation, 4.6 mm inner diameter×15 cm length×2 pieces), and an eluent (tetrahydrofuran). The mass average molecular weight (Mw) and the number average molecular weight were obtained from a calibration curve using standard polystyrenes. Furthermore, the molecular weight distribution was calculated by the following equation.

Molecular weight distribution=(mass average molecular weight)/(number average molecular weight)

(2) Glass-Transition Temperature (Tg)

The glass-transition temperature was calculated by the FOX equation using values described in a polymer handbook [Polymer HandBook (J. Brandrup, Interscience, 1989)].

(3) Average Particle Diameter

Regarding the average particle diameter of the acrylic rubber particles (A-1), a final particle diameter of a polymer latex of a polymer obtained by emulsion polymerization was measured by a dynamic light scattering method using a light scattering photometer (product name: "DLS-700," manufactured by Otsuka Electronics Co., Ltd.).

(4) Gel Content of Resin Composition

An acrylic resin pellet before being formed in a film shape was dissolved in chloroform to prepare a solution of 1% by mass chloroform, and the solution was left at 25° C. for a whole day and night. Thereafter, centrifuge separation was performed thereon at 16000 r.p.m for 90 minutes, % by mass of the insoluble matter after the supernatant solution thereof was removed and dried was considered as the gel content.

(5) Total Light Transmittance, Haze, Yellow Index, and White Index

The total light transmittance was evaluated according to JIS K7361-1, the haze was evaluated according to JIS K7136, the yellow index was evaluated according to JIS K7373, and the white index was evaluated according to JIS Z8715.

(6) Melamine Base Material Curing Temperature

An endothermic peak temperature when the temperature of the melamine base material was raised from 25° C. to 200° C. at a rate of 10° C./min under nitrogen stream was measured by using DSC6200 (product name, manufactured by SII Nano Technology Inc.) and the endothermic peak temperature was considered as a melamine base material curing temperature.

(7) Water Whitening Resistance Evaluation

The boiling test was performed at 100° C. for 2 hours according to CEN (European Committee for Standardization) standards, EN438-2, and a change in white indexes before and after the boiling test was measured.

(8) Adhesion Evaluation

The melamine decorative board in a state of room temperature was scored in grids of 100 squares at an interval of 1 mm by using a cutter knife, and then the peeling property was confirmed with a cellophane tape (manufactured by Nichiban Co., Ltd.). This test was performed before and after the boiling test. A case where squares were not peeled at all was evaluated as ○, a case where one or more but nine or less squares were peeled was evaluated as Δ, and a case where ten or more squares were peeled was evaluated as x.

(9) Thickness of Acrylic Resin Layer (II)

The acrylic resin laminate film was cut into a proper size, the cut piece was immersed in an aqueous solution of 0.5% by mass ruthenium tetroxide at room temperature for 15 hours so as to be dyed. Further, a sample was cut to have a thickness of about 70 nm such that a cross-section layer thereof could be observed by using a microtome and then the cross-section layer was photographed by a transmission electron microscope. The thickness of a portion where the acrylic rubber particles (A-1) did not exist was obtained from this photograph and was considered as the thickness of the acrylic resin layer (II).

(10) Weather Resistance Evaluation

The test was performed on the melamine decorative board by using Super Xenon Weather Meter SX75 (trade name, manufactured by Suga Test Instruments Co., Ltd.) at an irradiation intensity 60 W/m² (300 to 400 nm) with a filter #275 for one cycle including irradiation (63° C., 50% RH) 102 minutes and irradiation+spraying (95% RH) 18 minutes (120 minutes in total). The adhesion and the white index before and after the test were evaluated in the same manner as described above.

(11) Hydroxyl Value

First, an acid value of the sample was obtained by the following method. The sample was dissolved in acetone, phenolphthalein was used as an indicator, and then titration was performed using 0.1 mol/L of an ethanolic potassium hydroxide solution. In addition, the blank test was performed on other cases not using the sample by the same operation, and the acid value was obtained by the following equation.

Acid value=$(A-B) \times f \times 56.1 \times 0.1/S$ f: titer of 0.1 mol/L ethanolic potassium hydroxide
S: sample amount (g)
A: amount (ml) of ethanolic potassium hydroxide used in the titration
B: amount (ml) of ethanolic potassium hydroxide used in the blank test Next, after the sample was dissolved in acetic anhydride and pyridine and subjected to acetylation, phenolphthalein was used as an indicator and then titration was performed using 0.5 mol/L of an ethanolic potassium hydroxide solution. In addition, the blank test was performed on other cases not using the sample by the same operation, and the hydroxyl value was obtained by the following equation.

Hydroxyl value=$(B-A) \times f \times 56.1 \times 0.5/S+$acid value f: titer of 0.5 mol/L ethanolic potassium hydroxide
S: sample amount (g)
A: amount (ml) of ethanolic potassium hydroxide used in the titration
B: amount (ml) of ethanolic potassium hydroxide used in the blank test The value obtained by the above method is considered as a measured value of the hydroxyl value. The hydroxyl value in the present invention indicates the measured value of the hydroxyl value. Incidentally, a calculated value in Tables 1 and 4 is a value obtained when the introduction rate of the hydroxyl group monomer is assumed to be 100% and the acid value is assumed to be 0 (zero). The measured value of the hydroxyl value can be speculated from the calculated value of the hydroxyl value.

(12) Film Appearance

The film appearance was visually observed and the number of foreign materials per 100 cm² was counted.
○: 0 to 1 piece/100 cm²
Δ: 2 to 10 piece/100 cm²

(13) Pencil Hardness

The pencil hardness was evaluated according to JIS K5600-5-4.

Production Example 1

Production of Acrylic Rubber Particles (A-1A)

Into a reaction container equipped with a reflux condenser, 206 parts of deionized water was charged under a nitrogen atmosphere, and the temperature was raised to 80° C. Components (i) to be described below were added thereto, and ⅒ of raw materials (ii) to be described below (some of raw materials for the elastic copolymer (a-1)) were supplied thereto with stirring, followed by being maintained for 15 minutes. Subsequently, the remaining raw materials (ii) were continuously added such that the increase rate of the monomer mixture with respect to water became 8% by mass/hr. Thereafter, the resultant mixture was maintained for 1 hour and then polymerization was performed to thereby obtain a polymer latex. Subsequently, 0.2 part of sodium formaldehyde sulfoxylate was added to the polymer latex. Thereafter, the resultant mixture was maintained for 15 minutes, and raw materials (iii) to be described below (some of raw materials for the elastic copolymer (a-1)) were continuously added thereto while stirring was performed at 80° C. under a nitrogen atmosphere such that the increase rate of the monomer mixture with respect to water became 4% by mass/hr. Thereafter, the resultant mixture was maintained for 2 hours and then polymerization was performed to thereby obtain a latex of the elastic copolymer (a-1).

To this latex of the elastic copolymer (a-1), 0.2 part by mass of sodium formaldehyde sulfoxylate was added. Thereafter, the resultant mixture was maintained for 15 minutes, and raw materials (iv) to be described below (raw materials for the hard polymer (a-2)) was continuously added thereto while stirring was performed at 80° C. under a nitrogen atmosphere such that the increase rate of the monomer mixture with respect to water became 10% by mass/hr. Thereafter, the resultant mixture was maintained for 1 hour and then polymerization was performed to thereby obtain a latex of acrylic rubber particles (A-1A). The average particle diameter of the acrylic rubber particles (A-1A) was 0.28 μm.

This latex of the acrylic rubber particles (A-1A) was filtrated with a filter having an aperture of 50 μm. Subsequently, coagulation, aggregation, and solidification reaction were performed using calcium acetate, and then filtration, washing with water, and drying were performed to thereby obtain acrylic rubber particles (A-1A).

(i)
Sodium formaldehyde sulfoxylate 0.4 part
Ferrous sulfate 0.00004 part
Disodium ethylenediamine tetraacetate 0.00012 part
(ii)
MMA 11.25 parts
BA 12.5 parts
St 1.25 parts
AMA 0.094 part
1,3BD 0.75 part
t-BH 0.044 part
RS-610NA 0.75 part
(iii)
BA 30.9 parts
St 6.6 parts
AMA 0.66 part
1,3BD 0.09 part
CHP 0.11 part
RS-610NA 0.6 part
(iv)
MMA 35.6 parts
MA 1.9 parts
n-OM 0.11 part
t-BH 0.06 part Production Example 2

Production of Acrylic Rubber Particles (A-1B)

After 8.5 parts of deionized water was supplied to a container equipped with a stirrer, raw materials (ii) to be described below (some of raw materials for the elastic copolymer (a-1)) were added thereto with stirring, and stirring was carried out for 20 minutes to prepare an emulsified liquid.

Then, into a polymerization container equipped with a condenser, 191.5 parts of deionized water and components (i) to be described below were charged, and the temperature was raised to 70° C. Subsequently, the prepared emulsified liquid was added dropwise to the polymerization container for 8 minutes with stirring under nitrogen and then the reaction was continued for 15 minutes.

Subsequently, raw materials (iii) to be described below (some of raw materials for the elastic copolymer (a-1)) were added dropwise to the polymerization container for 90 minutes, and then the reaction was continued for 60 minutes to thereby obtain a latex of the elastic copolymer (a-1). Incidentally, the Tg of only the elastic copolymer (a-1) was −48° C.

Subsequently, raw materials (iv) to be described below were added dropwise to the polymerization container for 45 minutes, and then the reaction was continued for 60 minutes to form the intermediate polymer (a-3) on the elastic copolymer (a-1). Incidentally, the Tg of only the intermediate polymer (a-3) was 20° C.

Subsequently, raw materials (v) to be described below were added dropwise to the polymerization container for 140 minutes, and then the reaction was continued for 60 minutes to form the hard polymer (a-2) on the intermediate polymer (a-3). According to the above processes, a latex containing 100 parts of acrylic rubber particles (A-1B) was obtained. Incidentally, the Tg of only the hard polymer (a-2) was 84° C. Further, the average particle diameter of the acrylic rubber particles (A-1B) measured after polymerization was 0.12 μm.

This latex of the acrylic rubber particles (A-1B) was filtrated with a filter having an aperture of 50 μm. Subsequently, coagulation, aggregation, and solidification reaction were performed using calcium acetate, and then filtration, washing with water, and drying were performed to thereby obtain the acrylic rubber particles (A-1B).

(i)
Sodium formaldehyde sulfoxylate 0.2 part
Ferrous sulfate 0.0001 part
Disodium ethylenediamine tetraacetate 0.0003 part
(ii)
MMA 0.3 part
BA 4.5 parts
AMA 0.05 part
1,3BD 0.2 part
CHP 0.025 part
RS-610NA 1.1 parts
(iii)
MMA 1.5 parts
BA 22.5 parts
AMA 0.25 part
1,3BD 1.0 part
CHP 0.016 part
(iv)
MMA 6.0 parts
BA 4.0 parts
AMA 0.075 part
CHP 0.013 part (v)
MMA 55.2 parts
BA 4.8 parts
n-OM 0.22 part
t-BH 0.075 part Production Example 3

Production of Acrylic Rubber Particles (A-1C)

After 8.5 parts of deionized water was supplied to a container equipped with a stirrer, raw materials (ii) to be described below (some of raw materials for the elastic copolymer (a-1)) were added thereto with stirring, and stirring was carried out for 20 minutes to prepare an emulsified liquid.

Then, into a polymerization container equipped with a condenser, 191.5 parts of deionized water and components (i) to be described below were charged, and the temperature was raised to 70° C. Subsequently, the prepared emulsified liquid was added dropwise to the polymerization container for 8 minutes with stirring under nitrogen and then the reaction was continued for 15 minutes.

Subsequently, raw materials (iii) to be described below (some of raw materials for the elastic copolymer (a-1)) were added dropwise to the polymerization container for 90 minutes, and then the reaction was continued for 60 minutes to thereby obtain a latex of the elastic copolymer (a-1). Incidentally, the Tg of only the elastic copolymer (a-1) was −20° C.

Subsequently, raw materials (iv) to be described below were added dropwise to the polymerization container for 45 minutes, and then the reaction was continued for 60 minutes to form the intermediate polymer (a-3) on the elastic copolymer (a-1). Incidentally, the Tg of only the intermediate polymer (a-3) was 60° C.

Subsequently, raw materials (v) to be described below were added dropwise to the polymerization container for 140 minutes, and then the reaction was continued for 60 minutes to form the hard polymer (a-2) on the intermediate polymer (a-3). According to the above processes, a latex containing 100 parts of acrylic rubber particles (A-1C) was obtained. Incidentally, the Tg of only the hard polymer (a-2) was 99° C. Further, the average particle diameter of the acrylic rubber particles (A-1C) measured after polymerization was 0.12 μm.

This latex of the acrylic rubber particles (A-1C) was filtrated with a filter having an aperture of 50 μm. Subsequently, coagulation, aggregation, and solidification reaction were performed using calcium acetate, and then filtration, washing with water, and drying were performed to thereby obtain the acrylic rubber particles (A-1C).

(i)
Sodium formaldehyde sulfoxylate 0.2 part
Ferrous sulfate 0.0001 part
Disodium ethylenediamine tetraacetate 0.0003 part
(ii)
MMA 0.3 part
BA 4.5 parts
AMA 0.05 part
1,3BD 0.2 part
CHP 0.025 part
RS-610NA 1.3
(iii)
MMA 9.6 parts
BA 14.4 parts
AMA 0.25 part
1,3BD 1.0 part
CHP 0.016 part (iv)
MMA 6.0 parts
MA 4.0 parts
AMA 0.075 part
CHP 0.013 part
(v)
MMA 57 parts
MA 3 parts
n-OM 0.26 part
t-BH 0.075 part Production Example 4

Production of Acrylic Rubber Particles (A-1D)

Into a reaction container equipped with a reflux condenser, 153 parts of deionized water was charged under a nitrogen atmosphere, and the temperature was raised to 80° C. Components (i) to be described below were added thereto, and raw materials (ii) to be described below (some of raw materials for the elastic copolymer (a-1)) were added thereto with stirring. Thereafter, the resultant mixture was maintained for 1 hour and then polymerization was performed to thereby obtain a polymer latex. Subsequently, 0.1 part of sodium formaldehyde sulfoxylate was added to the polymer latex. Thereafter, the resultant mixture was maintained for 15 minutes, and raw materials (iii) to be described below (raw materials for the hard polymer (a-2)) were added while stirring was performed at 80° C. under a nitrogen atmosphere. Thereafter, the resultant mixture was maintained for 1 hour and then polymerization was performed to thereby obtain a latex of acrylic rubber particles (A-1D). The average particle diameter of the acrylic rubber particles (A-1D) was 0.12 μm.

This latex of the acrylic rubber particles (A-1D) was filtrated with a filter having an aperture of 50 μm. Subsequently, coagulation, aggregation, and solidification reaction were performed using calcium acetate, and then filtration, washing with water, and drying were performed to thereby obtain the acrylic rubber particles (A-1D).

(i)
Sodium formaldehyde sulfoxylate 0.4 part
Ferrous sulfate 0.00004 part
Disodium ethylenediamine tetraacetate 0.00012 part
(ii)
BA 50.9 parts
St 11.6 parts
AMA 0.56 part
t-BH 0.19 part
RS-610NA 1.0 part
(iii)
MMA 35.6 parts
MA 1.9 parts
t-BH 0.056 part
n-OM 0.16 part
RS-610NA 0.25 part Production Example 5

Production of Thermoplastic Polymer (C1)

Into a reaction container, 200 parts of ion-exchange water substituted with nitrogen was supplied, and 1 part of potassium oleate and 0.3 part of potassium persulfate were supplied thereto as an emulsifier. Subsequently, 40 parts of MMA, 10 parts of BA, and 0.005 part of n-OM were supplied thereto, and stirring was performed at 65° C. for 3 hours under a nitrogen atmosphere, thereby completing polymerization. Subsequently, a monomer mixture composed of 48 parts of MMA and 2 parts of BA was added dropwise for 2 hours and then maintained for 2 hours after the dropwise addition was completed, thereby completing polymerization. The obtained latex was added to an aqueous solution of 0.25% by mass sulfuric acid and the polymer was subjected to acid coagulation. Thereafter, dehydration, washing with water, and drying were performed so as to recover the polymer in a powder form. The mass average molecular weight of the obtained copolymer was 1,000,000.

Production Examples 6 to 16

Production of Reactive Group-Containing Acrylic Resins (B-1A) to (B-1K)

In Production Example 6, the following mixtures were supplied to a reaction container with a stirrer, a reflux condenser, a nitrogen gas inlet, and the like.
MMA 75 parts
BA 10 parts
HEMA 15 parts
n-OM 0.25 part
LPO 0.4 part
Copolymer of methyl methacrylate/methacrylic acid salt/salt of sulfoethyl methacrylate
0.02 part
Sodium sulfate 0.3 part
Ion-exchange water 145 parts The inside of the container was sufficiently replaced with nitrogen gas, then heated up to 75° C. with stirring, and polymerization reaction was allowed to advance in the nitrogen gas stream. After 2 hours, the temperature thereof was raised to 95° C. and further maintained for 60 minutes, thereby completing polymerization. A polymer bead thus obtained was dehydrated and dried to thereby obtain a reactive group-containing acrylic resin (B-1A).

Further, in Production Examples 7 to 16, reactive group-containing acrylic resins (B-1B) to (B-1K) were obtained in the same manner as the above procedures, except that raw materials to be used (MMA, BA, HEMA, and n-OH) were changed as presented in Table 1.

Production Examples 17 to 19

Production of Reactive Group-Containing Acrylic Resins (B-1L) to (B-1N)

Reactive group-containing acrylic resins (B-1L) to (B-1N) were obtained in the same manner as in Production Example 2, except that raw materials as presented in Table 2 were used instead of MMA and BA (60 parts in total) among the raw materials (v) in Production Example 2.

TABLE 2

| | Acrylic resin | MMA [part] | BA [part] | HEMA [part] | HPMA [part] |
|---|---|---|---|---|---|
| Production Example 2 | A-1B | 55.2 | 4.8 | — | — |
| Production Example 17 | B-1L | 52.44 | 4.56 | 3 | — |
| Production Example 18 | B-1M | 49.68 | 4.32 | 6 | — |
| Production Example 19 | B-1N | 52.44 | 4.56 | — | 3 |

Production Examples 20 to 27

Production of Acrylic Resin Compositions (A1) to (A8)

In Production Example 20, 1 part of the thermoplastic polymer (C1) of Production Example 5, 2 parts of LA-31, 0.1 part of LA-57, and 0.1 part of Irg1076 were added to 100 parts of a polymer mixture obtained by mixing 16 parts of the acrylic rubber particles (A-1A) of Production Example 1 as the acrylic rubber particles (A-1) and 84 parts of VH as the thermoplastic polymer (A-2) and mixed by using a Henschel mixer. Then, this resultant mixture was melt-kneaded by using a 35-mmφ screw type biaxial extruder (L/D=26) under the conditions including a cylinder tem-

TABLE 1

| | Reactive group-containing acrylic resin | MMA [part] | MA [part] | BA [part] | HEMA [part] | HPMA [part] | n-OM [part] | Molecular weight | Tg [° C.] | Hydroxyl value [mgKOH/g] Calculated value | Hydroxyl value [mgKOH/g] Measured value |
|---|---|---|---|---|---|---|---|---|---|---|---|
| Production Example 6 | B-1A | 75 | 0 | 10 | 15 | 0 | 0.25 | 96,000 | 72 | 65 | — |
| Production Example 7 | B-1B | 70 | 0 | 15 | 15 | 0 | 0.25 | 97,000 | 61 | 65 | — |
| Production Example 8 | B-1C | 80 | 0 | 15 | 0 | 5 | 0.15 | 131,000 | 64 | 19 | — |
| Production Example 9 | B-1D | 75 | 0 | 15 | 0 | 10 | 0.12 | 162,000 | 60 | 39 | 39 |
| Production Example 10 | B-1E | 70 | 0 | 15 | 0 | 15 | 0.15 | 146,000 | 56 | 58 | 53 |
| Production Example 11 | B-1F | 70 | 20 | 0 | 10 | 0 | 0.25 | 98,000 | 76 | 43 | — |
| Production Example 12 | B-1G | 65 | 20 | 0 | 15 | 0 | 0.25 | 102,000 | 74 | 65 | — |
| Production Example 13 | B-1H | 60 | 10 | 0 | 30 | 0 | 0.12 | 173,000 | 77 | 129 | 127 |
| Production Example 14 | B-1I | 60 | 0 | 10 | 0 | 30 | 0.25 | 104,000 | 55 | 117 | — |
| Production Example 15 | B-1J | 45 | 0 | 10 | 0 | 45 | 0.25 | 117,000 | 44 | 175 | — |
| Production Example 16 | B-1K | 70 | 0 | 15 | 0 | 15 | 0.25 | 98,000 | 56 | 58 | 52 | perature of 200° C. to 240° C. and a die temperature of 240° C. so as to be pelletized, thereby obtaining an acrylic resin composition (A1) for the acrylic resin layer (I).

Further, in Production Examples 21 to 27, acrylic resin compositions (A2) to (A8) for the acrylic resin layer (I) were obtained in the same manner as the above procedures, except that raw materials as presented in Table 3 were used as the acrylic rubber particles (A-1), the thermoplastic polymer (A-2), and the additive (C).

Example 5 as the reactive group-containing acrylic resin (B-1) and 0.1 part of Irg1076 were used and mixed with a Henschel mixer. Then, this resultant mixture was melt-kneaded by using a 35-mmφ screw type biaxial extruder (L/D=26) under the conditions including a cylinder temperature of 200° C. to 240° C. and a die temperature of 240° C. so as to be pelletized, thereby obtaining a resin composition (B1) for the acrylic resin layer (II).

TABLE 3

|  |  | A-1 |  |  | A-2 |  | C |  |  |  |  |  |
| --- | --- | --- | --- | --- | --- | --- | --- | --- | --- | --- | --- | --- |
|  | Acrylic resin composition | A-1A [part] | A-1B [part] | A-1C [part] | VH [part] | MD [part] | C1 [part] | LA-31 [part] | TV 1600 [part] | LA-57 [part] | Stearic acid [part] | Irg 1076 [part] |
| Production Example 20 | A1 | 16 | — | — | 84 | — | 1 | 2.1 | — | 0.15 | — | 0.1 |
| Production Example 21 | A2 | 24 | — | — | 76 | — | 1 | 2.1 | — | 0.15 | — | 0.1 |
| Production Example 22 | A3 | — | — | 45 | 55 | — | — | 2.1 | — | 0.15 | — | 0.1 |
| Production Example 23 | A4 | — | — | 75 | 25 | — | — | 2.1 | — | 0.15 | — | 0.1 |
| Production Example 24 | A5 | 10 | — | 80 | — | 10 | — | 2.1 | — | 0.15 | — | 0.1 |
| Production Example 25 | A6 | — | 100 | — | — | — | 2 | 2.1 | — | 0.15 | — | 0.1 |
| Production Example 26 | A7 | — | 100 | — | — | — | 4 | 2.4 | — | 0.45 | 0.25 | 0.1 |
| Production Example 27 | A8 | 16 | — | — | 84 | — | 1 | — | 2.1 | 0.15 | — | 0.1 |

Production Examples 28 to 49

Production of Resin Compositions (B1) to (B22)

In Production Example 28, 100 parts of the reactive group-containing acrylic resin (B-1A) of Production Example 5 as the reactive group-containing acrylic resin (B-1) and 0.1 part of Irg1076 were used and mixed with a Henschel mixer. Then, this resultant mixture was melt-kneaded by using a 35-mmφ screw type biaxial extruder (L/D=26) under the conditions including a cylinder temperature of 200° C. to 240° C. and a die temperature of 240° C. so as to be pelletized, thereby obtaining a resin composition (B1) for the acrylic resin layer (II).

In Production Examples 29 to 49, resin compositions (B2) to (B22) for the acrylic resin layer (II) were obtained in the same manner as the above procedures, except that raw materials as presented in Table 4 were used as the reactive group-containing acrylic resin (B-1), the acrylic resin (B-2) other than (B-1), and the additive (C).

TABLE 4

|  |  | B-1 |  | B-2 |  | C |  |  |  | Hydroxyl value [mgKOH/g] |  |
| --- | --- | --- | --- | --- | --- | --- | --- | --- | --- | --- | --- |
|  | Resin composition | Type | Used amount [part] | Type | Used amount [part] | LA-31 [part] | LA-57 [part] | C1 [part] | Irg1076 [part] | Calculated value | Measured value |
| Production Example 28 | B1 | B-1A | 100 | — | — | — | — | — | 0.1 | 65 | — |
| Production Example 29 | B2 | B-1B | 100 | — | — | — | — | — | 0.1 | 65 | — |
| Production Example 30 | B3 | B-1C | 100 | — | — | — | — | — | 0.1 | 19 | — |
| Production Example 31 | B4 | B-1D | 100 | — | — | — | — | — | 0.1 | 39 | — |
| Production Example 32 | B5 | B-1E | 100 | — | — | — | — | — | 0.1 | 58 | 52 |
| Production Example 33 | B6 | B-1F | 100 | — | — | — | — | — | 0.1 | 43 | — |
| Production Example 34 | B7 | B-1G | 100 | — | — | — | — | — | 0.1 | 65 | — |
| Production Example 35 | B8 | B-1I | 10 | A-1B | 90 | — | — | — | 0.1 | 12 | — |
| Production Example 36 | B9 | B-1I | 20 | A-1B | 80 | — | — | — | 0.1 | 23 | — |
| Production Example 37 | B10 | B-1I | 40 | A-1B | 60 | — | — | — | 0.1 | 47 | — |
| Production Example 38 | B11 | B-1I | 60 | A-1B | 40 | — | — | — | 0.1 | 70 | — |
| Production Example 39 | B12 | B-1I | 80 | A-1B | 20 | — | — | — | 0.1 | 94 | — |
| Production Example 40 | B13 | B-1J | 20 | A-1B | 80 | — | — | — | 0.1 | 35 | — |

TABLE 4-continued

|  | Resin composition | B-1 | | B-2 | | C | | | | Hydroxyl value [mgKOH/g] | |
|---|---|---|---|---|---|---|---|---|---|---|---|
|  |  | Type | Used amount [part] | Type | Used amount [part] | LA-31 [part] | LA-57 [part] | C1 [part] | Irg1076 [part] | Calculated value | Measured value |
| Production Example 41 | B14 | B-1J | 40 | A-1B | 60 | — | — | — | 0.1 | 70 | — |
| Production Example 42 | B15 | B-1J | 60 | A-1B | 40 | — | — | — | 0.1 | 105 | — |
| Production Example 43 | B16 | B-1K | 95 | A-1A | 5 | — | — | — | 0.1 | 55 | — |
| Production Example 44 | B17 | B-1K | 90 | A-1A | 10 | — | — | — | 0.1 | 52 | — |
| Production Example 45 | B18 | B-1K | 80 | A-1A | 20 | — | — | — | 0.1 | 46 | — |
| Production Example 46 | B19 | B-1K | 60 | A-1D | 40 | — | — | — | 0.1 | 35 | — |
| Production Example 47 | B20 | B-1E | 80 | A-1A | 20 | 2 | 0.3 | 2 | 0.1 | 46 | — |
| Production Example 48 | B21 | B-1H | 10 | A-1B | 90 | — | — | — | 0.1 | 13 | — |
| Production Example 49 | B22 | B-1H | 9 | A-1B | 91 | — | — | — | 0.1 | 12 | — |

Production Example 50

Production of Resin Composition (B23)

Into a flask provided with a nitrogen inlet, a stirrer, a condenser, a dropping funnel, and a thermometer, 47 parts of i-butyl acetate and 18 parts of ethyl acetate were put under a nitrogen atmosphere. The inner temperature of the flask was raised to 95° C. while the inside thereof was stirred. Thereafter, the following monomer mixture was added dropwise into the flask for 3 hours and then maintained at 95° C. for 1 hour.
(Monomer Mixture)
MAA 0.3 part
MMA 22.7 parts
St 30 parts
BMA 21 parts
HEMA 26 parts
2,2'-Azobis-2-methylbutyronitrile 0.7 part
Ethyl acetate 10 parts
Furthermore, a dropping solution obtained by mixing 20 parts of ethyl acetate and 0.6 part of 2,2'-azobis-2-methylbutyronitrile was added dropwise for 60 minutes and maintained at 95° C. for 90 minutes. After the solution was cooled, 200 parts of ethyl acetate was mixed therewith to thereby obtain a resin composition (B23) having a glass-transition temperature of 70° C. and a mass average molecular weight of 30,000.

Production Example 51

Production of Resin Composition (B24)

22.5 parts of the acrylic rubber particles (A-1B) and 260 parts of ethyl acetate were mixed with 100 parts of the resin composition (B23) to thereby obtain a resin composition (B24).

Examples 1 to 33

Manufacturing of Acrylic Resin Laminate Film and Melamine Decorative Board

In Example 1, the acrylic resin composition (A1) for the acrylic resin layer (I) obtained in Production Example 20 and the resin composition (B1) for the acrylic resin layer (II) obtained in Production Example 28 were dried at 80° C. for a whole day and night. The resin composition (B1) was plasticized by a 30-mmφ extruder having a cylinder temperature set to 240° C. Further, the acrylic resin composition (A1) was plasticized by a 40-mmφ extruder having a cylinder temperature set to 240° C. and equipped with a screen mesh of 400 meshes. Subsequently, the acrylic resin composition (A1) and the resin composition (B1) were formed into an acrylic resin laminate film having a thickness of 50 μm by using a feedblock die for two kinds and two layers having a temperature set to 250° C. while the acrylic resin layer (I) side was in contact with a mirror-finished cooling roll. The thicknesses of the acrylic resin layers (I) and (II) were 45 μm and 5 μm, respectively.

Further, a melamine base material was laminated on the surface side of the acrylic resin layer (II) of this acrylic resin laminate film, followed by being pressed under the conditions including a temperature of 140° C., a pressure of 4 MPa, and a time of 20 minutes to thereby manufacture a melamine decorative board. The evaluation results of the obtained melamine decorative board are shown in Table 5 and Table 7. The curing temperature of the used melamine base material was 94° C.

Further, in Examples 2 to 33, an acrylic resin laminate film and a melamine decorative board were manufactured by the same operation as in Example 1, except that materials as presented in Table 5 were used as the acrylic resin composition (A) for the acrylic resin layer (I) and the resin composition (B) for the acrylic resin layer (II) and the thicknesses of the acrylic resin layers (I) and (II) were set as presented in Table 5. The evaluation results of the obtained melamine decorative board are shown in Table 5 and Table 7. Incidentally, in Table 5, an amount of a monomer having a reactive substituent contained, as a copolymer component, in the reactive group-containing acrylic resin (B-1) with respect to 100% by mass of the resin composition (B) is referred to as a "functional group content." The functional group content is a value calculated from the supplied amount of the raw materials. The same is applied to Table 6.

Examples 34 and 35

Manufacturing of Acrylic Resin Laminate Film and Melamine Decorative Board

In Example 34, the acrylic resin composition (A4) for the acrylic resin layer (I) obtained in Production Example 23 was dried at 80° C. for a whole day and night. This dried pellet was supplied to a 40-mmφ non-vent screw extruder (L/D=26) equipped with a T die having a width of 300 mm to manufacture an acrylic resin film having a thickness of 50 μm. As the conditions at this time, a cylinder temperature was 200 to 240° C., a T die temperature was 240° C., and a cooling roll temperature was 80° C.

The resin composition (B23) was coated on 200 mm square of the acrylic resin film by a bar coater. Subsequently, the obtained product was left at 80° C. for 10 minutes in a hot air dryer and thus a solvent was volatilized to thereby obtain an acrylic resin laminate film. The thickness of the acrylic resin laminate film was 52 μm and the thickness of the acrylic resin layer (II) was 2 μm.

Further, a melamine base material was laminated on the surface side of the acrylic resin layer (II) of this acrylic resin laminate film, followed by being pressed under the conditions including a temperature of 140° C., a pressure of 4 MPa, and a time of 20 minutes to thereby manufacture a melamine decorative board. The evaluation results of the obtained melamine decorative board are shown in Table 6. The curing temperature of the used melamine base material was 94° C.

Further, in Example 35, an acrylic resin laminate film and a melamine decorative board were manufactured by the same operation as in Example 34, except that the resin composition (B24) was used instead of the resin composition (B23) as the resin composition (B) for the acrylic resin layer (II). The evaluation results of the obtained melamine decorative board are shown in Table 6.

Comparative Examples 1 to 3

An acrylic resin laminate film and a melamine decorative board were manufactured in the same manner as in Example 1, except that materials as presented in Table 5 were used as the acrylic resin composition (A) for the acrylic resin layer (I) and the resin composition (B) for the acrylic resin layer (II) and the thicknesses of the acrylic resin layers (I) and (II) were set as presented in Table 5. The evaluation results of the obtained melamine decorative board are shown in Table 5 and Table 7. A case where the layer (I) or the layer (II) is not described is a single layer film.

TABLE 5

| | Layer (I) | | Layer (II) | | | | Film appearance | Pencil hardness | Total light transmittance [%] | Haze | Yellow index | Initial state | | After boiling test | |
|---|---|---|---|---|---|---|---|---|---|---|---|---|---|---|---|
| | Acrylic Resin composition A | Thickness [μm] | Resin composition B | Monomer unit having reactive substituent | Functional group content [% by mass] | Thickness [μm] | | | | | | Adhesion | White index | Adhesion | White index |
| Example 1 | A1 | 45 | B1 | HEMA | 15 | 5 | △ | 3H | 91.7 | 6.3 | 1.7 | ○ | 10 | ○ | 25 |
| Example 2 | A2 | 45 | B1 | HEMA | 15 | 5 | △ | 2H | 91.9 | 5.7 | 2.0 | ○ | 10 | ○ | 22 |
| Example 3 | A3 | 45 | B1 | HEMA | 15 | 5 | △ | H | 91.8 | 5.1 | 1.8 | ○ | 10 | ○ | 24 |
| Example 4 | A4 | 45 | B1 | HEMA | 15 | 5 | △ | H | 91.6 | 5.3 | 1.5 | ○ | 10 | ○ | 26 |
| Example 5 | A5 | 45 | B1 | HEMA | 15 | 5 | △ | F | 91.6 | 5.3 | 1.6 | ○ | 10 | ○ | 32 |
| Example 6 | A6 | 45 | B1 | HEMA | 15 | 5 | △ | 4B | 92.0 | 3.5 | 1.4 | ○ | 10 | ○ | 31 |
| Example 7 | A3 | 45 | B2 | HEMA | 15 | 5 | △ | — | 92.0 | 3.5 | 1.3 | ○ | 10 | ○ | 23 |
| Example 8 | A6 | 45 | B3 | HPMA | 5 | 5 | ○ | — | 92.3 | 0.6 | 1.0 | ○ | 10 | ○ | 25 |
| Example 9 | A6 | 45 | B4 | HPMA | 10 | 5 | ○ | — | 92.4 | 0.8 | 1.0 | ○ | 11 | △ | 26 |
| Example 10 | A6 | 45 | B5 | HPMA | 15 | 10 | ○ | — | 93.0 | 0.6 | 1.3 | ○ | 10 | ○ | 28 |
| Example 11 | A6 | 90 | B5 | HPMA | 15 | 3 | ○ | — | 92.3 | 1.1 | 1.0 | ○ | 10 | ○ | 29 |
| Example 12 | A6 | 27 | B5 | HPMA | 15 | 30 | △ | — | 92.5 | 0.9 | 1.3 | ○ | 10 | ○ | 32 |
| Example 13 | A6 | 70 | B5 | HPMA | 15 | 15 | ○ | — | 92.0 | 1.1 | 1.2 | ○ | 10 | ○ | 27 |
| Example 14 | A6 | 35 | B5 | HPMA | 15 | 3 | △ | — | 92.2 | 0.9 | 1.0 | ○ | 10 | △ | 38 |
| Example 15 | A6 | 47 | B5 | HPMA | 15 | 5 | ○ | — | 92.4 | 0.8 | 1.1 | ○ | 10 | ○ | 33 |
| Example 16 | A3 | 45 | B6 | HEMA | 10 | 5 | △ | — | 92.3 | 0.6 | 0.9 | ○ | 10 | △ | 25 |
| Example 17 | A3 | 45 | B7 | HEMA | 15 | 5 | ○ | — | 92.4 | 0.5 | 0.9 | ○ | 10 | ○ | 24 |
| Example 18 | A1 | 45 | B8 | HPMA | 3 | 5 | △ | — | 91.1 | 28.0 | 4.3 | ○ | 10 | ○ | 21 |
| Example 19 | A1 | 45 | B9 | HPMA | 6 | 5 | ○ | — | 91.5 | 10.0 | 2.2 | ○ | 10 | ○ | 21 |
| Example 20 | A1 | 45 | B10 | HPMA | 12 | 5 | △ | — | 92.4 | 1.9 | 1.4 | ○ | 10 | ○ | 19 |
| Example 21 | A1 | 45 | B11 | HPMA | 18 | 5 | ○ | — | 92.2 | 2.2 | 1.3 | ○ | 10 | ○ | 21 |
| Example 22 | A1 | 45 | B12 | HPMA | 24 | 5 | △ | — | 92.5 | 0.8 | 0.9 | ○ | 10 | ○ | 22 |
| Example 23 | A1 | 45 | B13 | HPMA | 9 | 5 | △ | — | 92.2 | 3.6 | 1.7 | ○ | 10 | ○ | 22 |
| Example 24 | A1 | 45 | B14 | HPMA | 18 | 5 | △ | — | 92.2 | 2.3 | 1.5 | ○ | 10 | ○ | 23 |
| Example 25 | A1 | 45 | B15 | HPMA | 27 | 5 | △ | — | 92.3 | 2.0 | 1.5 | ○ | 10 | ○ | 20 |
| Example 26 | A1 | 45 | B16 | HPMA | 14.3 | 5 | △ | — | 92.4 | 1.0 | 0.9 | ○ | 10 | △ | 19 |
| Example 27 | A1 | 45 | B17 | HPMA | 13.5 | 5 | △ | — | 92.4 | 1.7 | 1.3 | ○ | 10 | △ | 19 |
| Example 28 | A1 | 45 | B18 | HPMA | 12 | 5 | △ | — | 92.4 | 2.1 | 1.4 | ○ | 10 | ○ | 21 |
| Example 29 | A7 | 45 | B5 | HPMA | 15 | 5 | ○ | 4B | 92.5 | 0.7 | 1.1 | ○ | 10 | ○ | 25 |
| Example 30 | A1 | 45 | B5 | HPMA | 15 | 5 | ○ | — | 92.5 | 1.5 | 1.2 | ○ | 10 | △ | 16 |
| Example 31 | A8 | 45 | B5 | HPMA | 15 | 5 | △ | — | 92.4 | 1.8 | 1.4 | ○ | 10 | ○ | 23 |
| Example 32 | A7 | 45 | B19 | HPMA | 9 | 5 | △ | — | 92.5 | 2.3 | 1.4 | ○ | 10 | ○ | 18 |
| Example 33 | A6 | 45 | B20 | HPMA | 12 | 5 | ○ | — | 92.5 | 2.0 | 1.5 | ○ | 10 | ○ | 30 |
| Comparative Example 1 | A6 | 50 | — | — | — | — | ○ | — | 93.0 | 0.6 | 1.0 | ○ | 11 | × | 30 |
| Comparative Example 2 | — | — | B21 | HEMA | 3 | 50 | ○ | — | 91.0 | 62.0 | 6.2 | ○ | 11 | × | 40 |
| Comparative Example 3 | A6 | 45 | B22 | HEMA | 2.7 | 5 | ○ | — | 91.3 | 44.3 | 6.5 | ○ | 11 | × | 46 |

TABLE 6

| | Layer (I) | | Layer (II) | | | Initial state | | After boiling test | |
|---|---|---|---|---|---|---|---|---|---|
| | Acrylic resin composition A | Thickness [μm] | Resin composition B | Functional group content [% by mass] | Thickness [μm] | Adhesion | White index | Adhesion | White index |
| Example 34 | A4 | 50 | B23 | 26.3 | 2 | Δ | 14 | Δ | 30 |
| Example 35 | A4 | 50 | B24 | 14.1 | 2 | ○ | 14 | Δ | 30 |

TABLE 7

| | | | Example 1 | Example 10 | Comparative Example 1 | Comparative Example 2 | Comparative Example 3 |
|---|---|---|---|---|---|---|---|
| Functional group content [% by mass] | | | 15 | 15 | 0 | 3 | — |
| Weather resistance evaluation | Adhesion/ test time [hr] | 0 | ○ | ○ | ○ | ○ | — |
| | | 1000 | ○ | ○ | x | ○ | — |
| | | 2000 | ○ | ○ | x | Δ | — |
| | | 3000 | ○ | ○ | x | x | — |
| | White index/ test time [hr] | 0 | 11 | 10 | 10 | 10 | 10 |
| | | 1000 | 12 | 11 | 12 | 11 | 30 |
| | | 2000 | 12 | 12 | 18 | 13 | 44 |
| | | 3000 | 13 | 14 | 18 | 16 | 48 |

Based on Examples and Production Examples described above, the following matters were clarified. The acrylic resin laminate films obtained in Examples 1 to 35 were excellent in adhesiveness with the melamine base material, and in the melamine decorative boards using these acrylic resin laminate films, a case where ten or more squares were peeled did not occur in the adhesion evaluation. Further, these melamine decorative boards had small change in white index after the boiling test and the remarkable deterioration of appearance was suppressed. These acrylic resin laminate films and melamine decorative boards have favorable adhesiveness and stability with respect hot water, and have a high industrial utility value. In particular, in Examples 1 to 7, 9 to 11, 14, 16, 17, 19 to 21, 23, 24, 28, 29, and 31 to 33, high adhesiveness can be secured even after the boiling test, and the melamine decorative boards using these acrylic resin laminate films have particularly favorable stability with respect hot water and have a higher industrial utility value.

On the other hand, in the acrylic resin laminate film obtained in Comparative Example 3, the content of the monomer unit having a reactive substituent in the resin composition (B) was less than 3% by mass and the hydroxyl value of the resin composition (B) was less than 15 mgKOH/g. For this reason, adhesiveness with the melamine base material was low and ten or more squares were peeled in the adhesion evaluation. The acrylic resin laminate film was easily peeled when being used in the melamine decorative board, and the melamine decorative board with favorable quality could not be obtained. Further, since the acrylic resin laminate film obtained in each of Comparative Examples 1 and 2 did not have the acrylic resin layer (I) or (II), it was inferior in the water resistance and ten or more squares were peeled in the adhesion evaluation.

This application claims priority based on Japanese Patent Application No. 2013-110816 filed in Japan on May 27, 2013, all of which disclosure is incorporated herein by reference.

Hereinbefore, the present invention has been described with reference to embodiments and Examples, but the present invention is not intended to be limited to the above embodiments and Examples. It should be understood by those skilled in the art that various modifications could be made to the configuration and details of the present invention without departing from the scope of the present invention.

The invention claimed is:

1. An acrylic resin laminate film comprising:
   a first acrylic resin layer (I) consisting of an acrylic resin composition (A) containing acrylic rubber particles (A-1) having a multilayer structure of two or more layers in which a layer containing a hard polymer (a-2) as an outer layer is formed on a layer containing an elastic copolymer (a-1) as an inner layer; and
   a second acrylic resin layer (II) consisting of a resin composition (B) containing
   40 to 100% by mass of a first acrylic resin (B-1) containing a monomer unit having a secondary hydroxyl group in an amount of 5% by mass or more and up to 50% by mass with respect to 100% by mass of the resin composition (B);
   0 to 60% by mass of a second acrylic resin (B-2) other than the first acrylic resin (B-1) with respect to 100% by mass of the first acrylic resin (B-1) and the second acrylic resin (B-2) in total; and
   0 to 50 parts by mass of an additive (C) other than the first acrylic resin (B-1) and the second acrylic resin (B-2) with respect to 100 parts by mass of the first acrylic resin (B-1) and the second acrylic resin (B-2) in total.

2. The acrylic resin laminate film according to claim 1, wherein a glass-transition temperature of the first acrylic resin (B-1) is 0° C. to 90° C.

3. The acrylic resin laminate film according to claim 1, wherein a content of an aromatic vinyl monomer unit in the first acrylic resin (B-1) is 0% to 3% by mass with respect to 100% by mass of the first acrylic resin (B-1).

4. The acrylic resin laminate film according to claim 1, wherein the resin composition (B) is composed of the first acrylic resin (B-1) and the additive (C).

5. The acrylic resin laminate film according to claim 1, wherein a thickness of the acrylic resin laminate film is 100 μm or less.

6. The acrylic resin laminate film according to claim 1, wherein a thickness of the second acrylic resin layer (II) is 30 μm or less.

7. The acrylic resin laminate film according to claim 1, wherein the resin composition (B) contains 0.1 to 5 parts by mass of the additive (C).

8. The acrylic resin laminate film according to claim 1, wherein the content of the monomer unit having the secondary hydroxyl group is 10% by mass or more and up to 50% by mass with respect to 100% by mass of the resin composition (B).

9. The acrylic resin laminate according to claim 1, wherein the monomer unit having the secondary hydroxyl group is selected from the group consisting of hydroxypropyl methacrylate, hydroxybutyl methacrylate, hydroxypropyl acrylate and hydroxybutyl acrylate.

10. The acrylic resin laminate film according to claim 1, wherein the resin composition (B) comprises 5% to 60% by mass of the second acrylic resin (B-2) other than the first acrylic resin (B-1) with respect to 100% by mass of the first acrylic resin (B-1) and the second acrylic resin (B-2) in total.

11. The acrylic resin laminate film according to claim 1, wherein the resin composition (B) comprises 0.1 to 50 parts by mass the additive (C) other than the first acrylic resin (B-1) and the second acrylic resin (B-2) with respect to 100% by mass of the first acrylic resin (B-1) and the second acrylic resin (B-2) in total.

12. A method for manufacturing the acrylic resin laminate film according to claim 1, the method utilizing a co-extrusion method in manufacturing of the acrylic resin laminate film.

13. A method for manufacturing the acrylic resin laminate film according to claim 1, the method utilizing a coating method in manufacturing of the acrylic resin laminate film.

14. A method, comprising applying the acrylic resin laminate film according to claim 1 as a protective film to a base material.

15. A method of protecting a surface of a melamine decorative board comprising applying the acrylic resin laminate film according to claim 1 as a film.

16. A melamine decorative board comprising the acrylic resin laminate film according to claim 1 and a melamine base material laminated in the order of the first acrylic resin layer (I), the second acrylic resin layer (II), and the melamine base material.

17. An acrylic resin laminate film comprising:
   a first acrylic resin layer (I) composed of an acrylic resin composition (A) containing acrylic rubber particles (A-1) having a multilayer structure of two or more layers in which a layer containing a hard polymer (a-2) as an outer layer is formed on a layer containing an elastic copolymer (a-1) as an inner layer; and
   a second acrylic resin layer (II) composed of a resin composition (B) containing
      40 to 100% by mass of a first acrylic resin (B-1) containing a monomer unit having a secondary hydroxyl group in an amount of 5% by mass or more and up to 50% by mass with respect to 100% by mass of the resin composition (B), wherein the first acrylic resin composition (B-1) has a glass-transition temperature of 15° C. to 80° C.;
      0 to 60% by mass of a second acrylic resin (B-2) other than the first acrylic resin (B-1) with respect to 100% by mass of the first acrylic resin (B-1) and the second acrylic resin (B-2) in total; and
      0 to 50 parts by mass of an additive (C) other than the first acrylic resin (B-1) and the second acrylic resin (B-2) with respect to 100 parts by mass of the first acrylic resin (B-1) and the second acrylic resin (B-2) in total, and
      a hydroxyl value of the resin composition (B) is 15 mgKOH/g to 300 mgKOH/g.

18. The acrylic resin laminate film according to claim 17, wherein the hydroxyl value of the resin composition (B) is 20 mgKOH/g to 120 mgKOH/g.

19. The acrylic resin laminate film according to claim 17, wherein the hydroxyl value of the resin composition (B) is 25 mgKOH/g to 180 mgKOH/g.

* * * * *